(12) United States Patent
Port

(10) Patent No.: US 11,067,313 B2
(45) Date of Patent: Jul. 20, 2021

(54) MODULAR FLOATING PLATFORM FOR SOLAR PANEL STRAPS AND BALLAST TRAY HOLD-DOWNS FOR SOLAR PANEL STRAPS

(71) Applicant: Jonathan Port, Los Angeles, CA (US)

(72) Inventor: Jonathan Port, Los Angeles, CA (US)

(73) Assignee: SolarStrap Technologies, LLC, Los Angeles, CA (US)

( * ) Notice: Subject to any disclaimer, the term of this patent is extended or adjusted under 35 U.S.C. 154(b) by 239 days.

(21) Appl. No.: 15/682,731

(22) Filed: Aug. 22, 2017

(65) Prior Publication Data

US 2017/0370621 A1    Dec. 28, 2017

Related U.S. Application Data

(63) Continuation-in-part of application No. 14/811,607, filed on Jul. 28, 2015, now Pat. No. 9,742,347, which
(Continued)

(51) Int. Cl.
*F24S 20/70*     (2018.01)
*H02S 20/30*     (2014.01)
(Continued)

(52) U.S. Cl.
CPC .............. *F24S 20/70* (2018.05); *B63B 35/44* (2013.01); *F24S 25/16* (2018.05); *F24S 25/50* (2018.05); *F24S 25/61* (2018.05); *H02S 20/10* (2014.12); *H02S 20/22* (2014.12); *H02S 20/30* (2014.12); *B63B 2035/4453* (2013.01);
(Continued)

(58) Field of Classification Search
CPC ......... Y02E 10/47; Y02E 10/50; B63B 35/44; B63B 2035/4453; F24S 20/70; F24S 25/16; F24S 25/50; F24S 25/61; F24S 25/613; F24S 2025/02; F24S 2025/014; F24S 2025/6006; H02S 20/10; H02S 20/22; H02S 20/30; Y02B 10/10; Y02B 10/20

See application file for complete search history.

(56) References Cited

U.S. PATENT DOCUMENTS

| | | | | |
|---|---|---|---|---|
| 2008/0000903 A1* | 1/2008 | Cap | ..................... | B65D 88/36 220/216 |
| 2012/0279557 A1* | 11/2012 | Alwitt | ..................... | F24S 25/50 136/251 |
| 2012/0324888 A1* | 12/2012 | Tiefenbacher | ........ | F24S 30/422 60/641.15 |

FOREIGN PATENT DOCUMENTS

WO    WO-2015109173 A1 *   7/2015  ............. F24S 25/16

* cited by examiner

*Primary Examiner* — Mayla Gonzalez Ramos
(74) *Attorney, Agent, or Firm* — David A. Belasco; Belasco Jacobs & Townsley, PC

(57) ABSTRACT

A floating platform for solar panels is provided. The floating platform may include a plurality of plates. Each of the plurality of plates may have a ballast chamber filled with a ballast material. Each of the plurality of plates may further have a float chamber disposed over the ballast chamber. Each of the plurality of plates may further have a channel passing through the ballast chamber and the float chamber. The channel may further have one or more openings to pass water into the ballast chamber and an opening to pass air from the channel. Each of the plurality of plates may further have a locking member. Each of the plurality of plates may further have one or more connection sections for placing one or more strap assemblies. The strap assemblies may be provided for disposing one or more solar panels on the plurality of plates.

19 Claims, 21 Drawing Sheets

Related U.S. Application Data is a continuation-in-part of application No. PCT/US2013/025622, filed on Feb. 11, 2013.

(51) Int. Cl.
    *B63B 35/44*     (2006.01)
    *F24S 25/50*     (2018.01)
    *F24S 25/16*     (2018.01)
    *F24S 25/00*     (2018.01)
    *F24S 25/60*     (2018.01)
    *F24S 25/61*     (2018.01)
    *H02S 20/22*     (2014.01)
    *H02S 20/10*     (2014.01)

(52) U.S. Cl.
    CPC ...... *F24S 2025/014* (2018.05); *F24S 2025/02* (2018.05); *F24S 2025/6006* (2018.05); *Y02B 10/10* (2013.01); *Y02B 10/20* (2013.01); *Y02E 10/47* (2013.01)

1600

PROVIDE, ON EACH OF A PLURALITY OF PLATES, A BALLAST CHAMBER FILLED WITH A BALLAST MATERIAL, THE BALLAST CHAMBER HAVING A BOTTOM SURFACE TO BE FACED TO A WATER SURFACE
1602

PROVIDE, ON EACH OF THE PLURALITY OF PLATES, A FLOAT CHAMBER DISPOSED OVER THE BALLAST CHAMBER
1604

PROVIDE, ON EACH OF THE PLURALITY OF PLATES, A CHANNEL PASSING THROUGH THE BALLAST CHAMBER AND THE FLOAT CHAMBER, THE CHANNEL HAVING A FIRST PORTION PASSING IN THE BALLAST CHAMBER AND A SECOND PORTION PASSING IN THE FLOAT CHAMBER, THE CHANNEL HAVING ONE OR MORE OPENINGS IN THE FIRST SECTION A TO PASS WATER INTO THE BALLAST CHAMBER AND AN OPENING IN THE SECOND PORTION TO PASS AIR FROM THE CHANNEL
1606

PROVIDE, ON EACH OF THE PLURALITY OF PLATES, ONE OR MORE CONNECTION SECTIONS FOR PLACING ONE OR MORE STRAP ASSEMBLIES TO BE ATTACHED TO THE PLURALITY OF PLATES, THE ONE OR MORE STRAP ASSEMBLIES BEING PROVIDED FOR DISPOSING ONE OR MORE SOLAR PANELS ON THE PLURALITY OF PLATES
1608

CONNECT THE PLURALITY OF PLATES TO EACH OTHER USING A LOCKING MEMBER PROVIDED ON ONE OR MORE SIDE PORTIONS OF THE PLURALITY OF PLATES
1610

FIG. 16

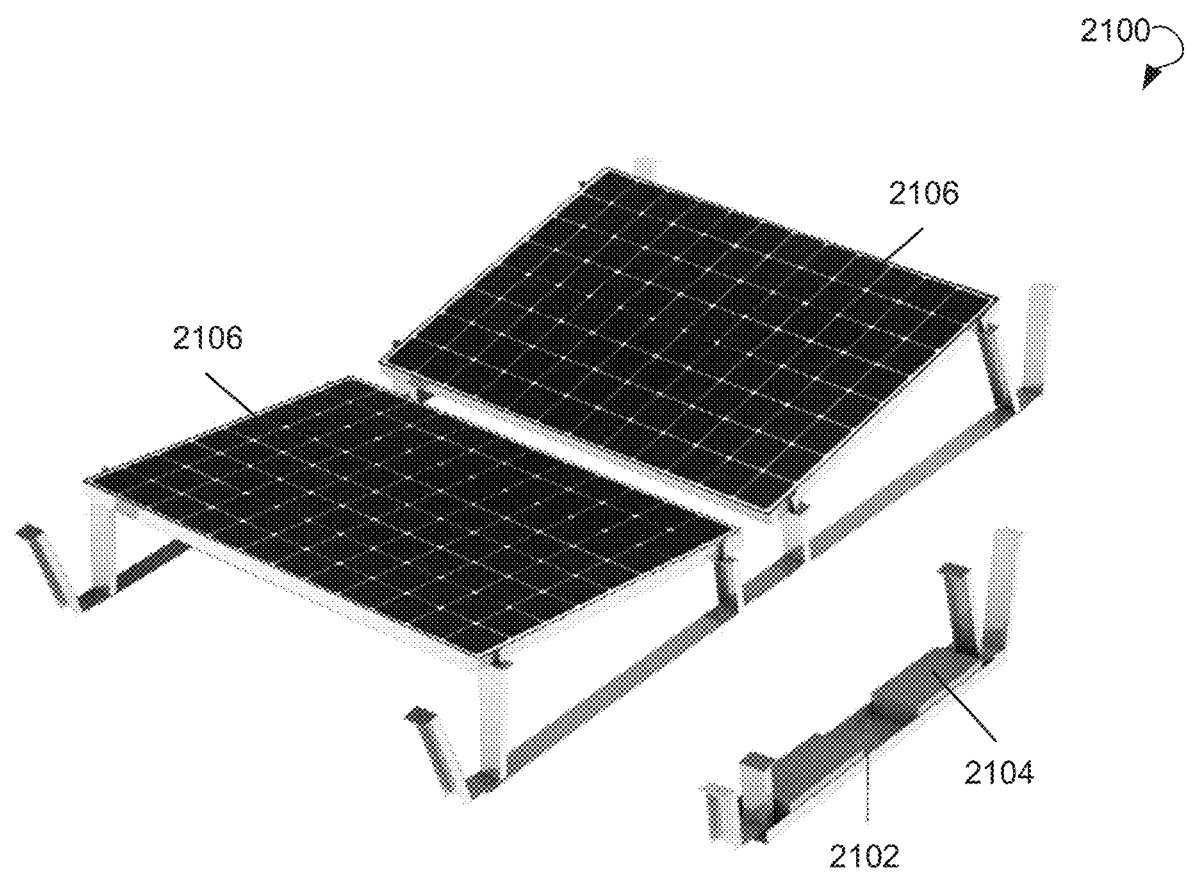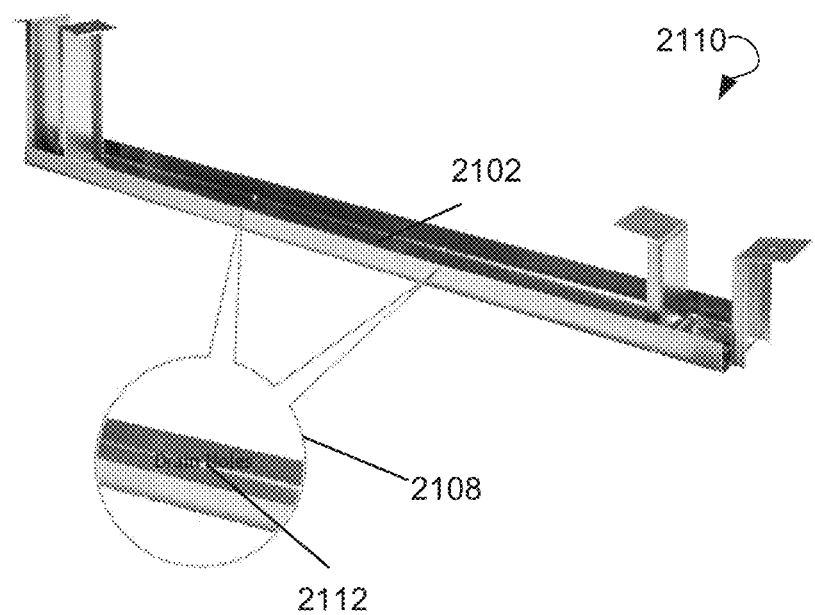
FIG. 21

MODULAR FLOATING PLATFORM FOR SOLAR PANEL STRAPS AND BALLAST TRAY HOLD-DOWNS FOR SOLAR PANEL STRAPS

CROSS REFERENCE TO RELATED APPLICATIONS

This application is a Continuation-in-Part of U.S. patent application Ser. No. 14/811,607 filed on Jul. 28, 2015, which is a Continuation-in-Part of PCT application PCT/US2013/025622 filed on Feb. 11, 2013. The entire specification, claims and drawings of the aforementioned applications are hereby incorporated by reference.

BACKGROUND OF THE INVENTION

(1) Field of the Invention

The present invention relates to the field of solar panels and more particularly to modular floating platforms for solar panels and methods for manufacturing modular floating platforms for solar panels.

(2) Description of the Related Art

Solar panels are typically installed on surfaces including roofs, walls, and the ground. Meanwhile, the territory of a country may have multiple water resources, such as oceans, seas, rivers, ponds, and lakes, and further may include water reservoirs of different sizes. Such water resources and water reservoirs may be used as sources of marine and hydrokinetic energy and hydroelectricity. However, the use of water resources and water reservoirs as a tool in generating solar energy is not widespread. The installation of solar panels on water reservoirs may be expensive and time-consuming. Additionally, permanent constructions used for mounting the solar panels on a water surface may affect an ecosystem of the water resources and water reservoirs.

Additionally, most conventional types of solar panels have photovoltaic cells only on an upper surface of the solar panels while a bottom surface of the solar panels is not involved in generation of energy. Some double-sided, or bifacial, solar panels need to be rotated depending on a direction of sunlight. However, manufacturing and installing rotation mechanisms for the two-sided solar panels may be time- and cost-prohibitive and may require additional maintenance expenses. In case of vertical installation of double-sided solar panels, generation of energy may be less efficient during periods of intense sunlight.

SUMMARY OF THE INVENTION

In one example embodiment of this disclosure, there is provided a floating platform for solar panels. The floating platform may include a plurality of plates. Each of the plurality of plates may have a ballast chamber filled with a ballast material. The ballast chamber may have a bottom surface to face a water surface. Each of the plurality of plates may further have a float chamber disposed over the ballast chamber. Each of the plurality of plates may further have a channel passing through the ballast chamber and the float chamber. The channel may have a first portion passing in the ballast chamber and a second portion passing in the float chamber. The channel may further have one or more openings in the first section to pass water into the ballast chamber and an opening in the second portion to pass air from the channel. Each of the plurality of plates may further have one or more connection sections for placing one or more strap assemblies to be attached to the plurality of plates. The one or more strap assemblies may be provided for disposing one or more solar panels on the plurality of plates. Each of the plurality of plates may further have a locking member on one or more side portions of the plurality of plates.

In another embodiment of this disclosure, a strap assembly may be secured to a surface by a ballast placed on top of the plurality of straps. The strap assembly may have a plurality of straps fastened end to end. The straps may have vertical side walls ballast may be placed between the vertical side walls. The vertical side walls may be located along the entire length of the strap assembly or along a portion of the length of the strap assembly.

In another embodiment of this disclosure, there is provided a method for manufacturing a floating platform for solar panels. The method may include providing a plurality of plates. Specifically, a ballast chamber filled with a ballast material may be provided on each of the plurality of plates. The ballast chamber may have a bottom surface to be faced to a water surface. A float chamber disposed over the ballast chamber may be provided on each of the plurality of plates. A channel passing through the ballast chamber and the float chamber may be provided on each of the plurality of plates. The channel may have a first portion passing in the ballast chamber and a second portion passing in the float chamber. The channel may have one or more openings in the first section to pass water into the ballast chamber and an opening in the second portion to pass air from the channel. On each of the plurality of plates, one or more connection sections may be provided for placing one or more strap assemblies to be attached to the plurality of plates. The one or more strap assemblies may be provided for disposing one or more solar panels on the plurality of plates. The plurality of plates may be connected to each other using a locking member provided on one or more side portions of the plurality of plates.

In another embodiment of this disclosure, there is provided a method for securing a strap assembly to a surface by a ballast. The strap assembly may have a plurality of straps fastened end to end. The method may be placing ballast on top of strap assembly. The straps may have vertical side walls and the ballast may be placed between the vertical side walls. The vertical side walls may be located along the entire lengths of the strap assembly or along a portion of the length of the strap assembly.

An appreciation of the other aims and objectives of the present invention and an understanding of it may be achieved by referring to the accompanying drawings and description of a preferred embodiment.

BRIEF DESCRIPTION OF THE DRAWINGS

FIG. 16 is a flow diagram showing a method for manufacturing a floating platform for solar panels, according to an example embodiment.

FIG. 21 is a schematic diagram showing a strap assembly and a ballast, according to an example embodiment.

DETAILED DESCRIPTION OF THE PREFERRED EMBODIMENT

Figure 1:
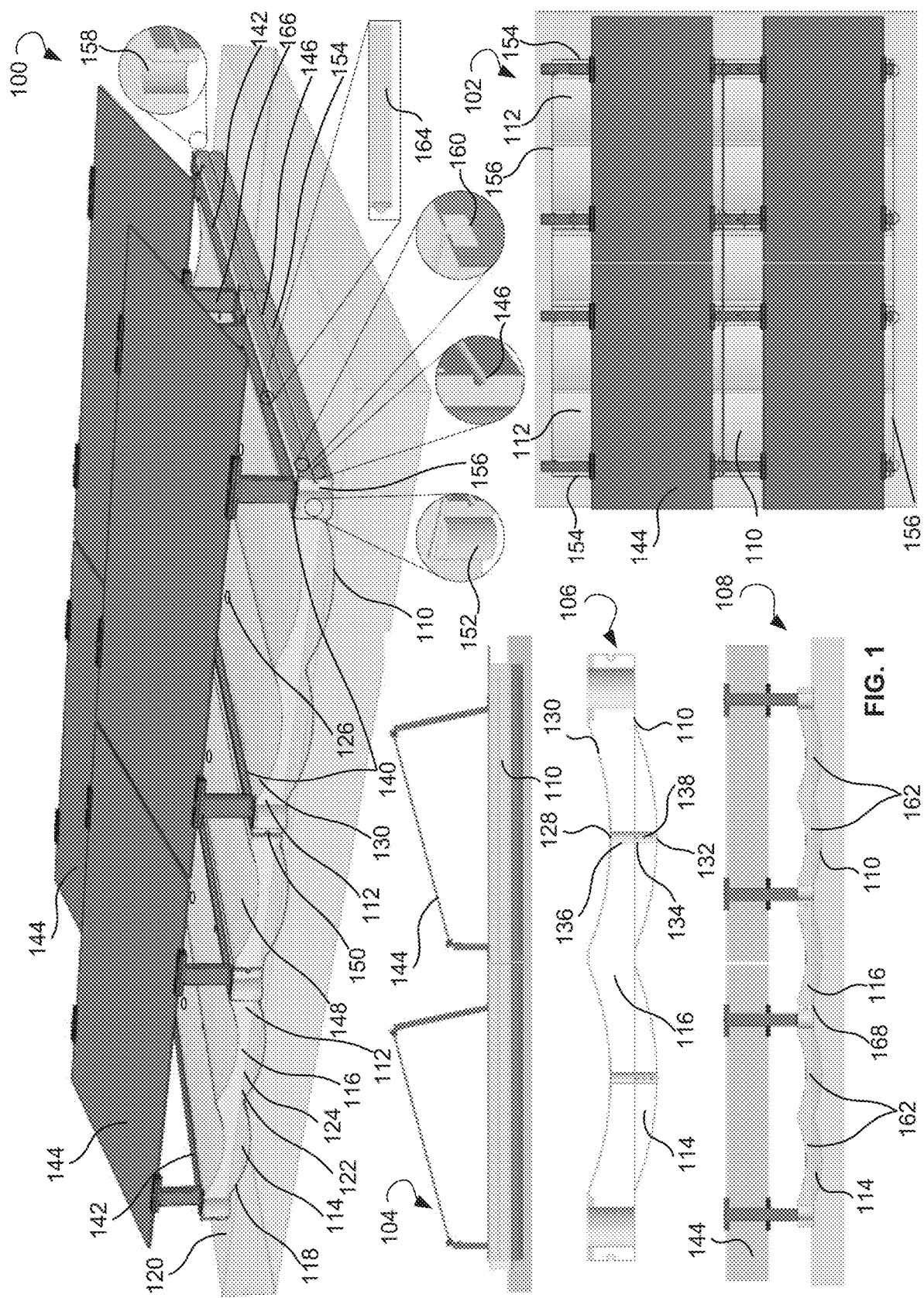
FIG. 1 shows a floating platform for solar panels, according to an example embodiment.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The disclosure is generally directed to modular floating platforms for solar panels. A floating platform may consist of a plurality of modules, namely a plurality of plates connected to each other to form the floating platform. A plurality of solar panels may be mounted on the floating platform. The floating platform may be used in water reservoirs and pools, and on water resources, such as rivers, lakes, oceans, and the like. Therefore, a water surface of water reservoirs may be effectively used for generating energy using solar panels floating on the water surface using the floating platform. Covering the surface of the water reservoir with floating platforms may also reduce water loss in the water reservoir resulting from evaporation.

The floating platform may include strap assemblies for connecting the solar panels to the plates. The strap assemblies may consist of multiple straps. The straps may be mounted on the plates, and the solar panels may be mounted on the straps.

The plates may include two chambers, namely a ballast chamber and a float chamber. Each of the chambers may be a hollow chamber made of a light-weight material, such as plastic material. The plates may be molded. The ballast chamber is a lower chamber and the float chamber is an upper chamber. The floating platform may be placed on the water surface so that a bottom surface of the ballast chamber of the plates faces the water. Upon placing the floating platform into the water, the floating platform may be partially submerged in the water so that a water level may be on the sides of the plates. In an example embodiment, the floating platform may be placed into the water so that at least a portion of the ballast chamber is submerged in the water, the ballast chamber is completely submerged in the water, at least a portion of the float chamber is submerged in the water, and so forth. The exact position of the water level can be controlled by the relative sizes of the ballast chamber and the float chamber, by amount and weight of ballast present in the ballast chamber, and other methods.

To provide the floatability of the floating platform, the ballast chamber disposed under the float chamber may be filled with a ballast, such as water, and the float chamber may be filled with air. One or more channels may be made in the plates. The channels may pass through both of the ballast chamber and the float chamber. Specifically, the channel may have a first end, i.e., an opening, on an upper surface of the float chamber and a second end, i.e., an opening, on a bottom surface of the ballast chamber. Additionally, in a portion of the ballast chamber, the channel may have lateral openings to connect the environment and the ballast chamber. Therefore, when the plate is placed on the water, the water may pass through the opening in the bottom surface of the ballast chamber and through the lateral openings into the ballast chamber. When water enters the channel, air may exit from the channel through the opening in the upper surface of the float chamber. The float chamber may be sealed so that the air present in the float chamber cannot be discharged from the float chamber. The water may fill the ballast chamber completely and may serve as the ballast material of the ballast chamber.

Each of the plates may further have connection sections for placing the strap assemblies on the plates. The connection sections may be flat peripheral sections on the upper surface of the plates. Side surfaces of the plates may have locking members. The locking members may be used to attach the plates to each other or attach each of the plates to spacers placed between each two adjacent plates.

The upper surface of the float chamber may be reflective (for example, may be made of a reflective material or covered with the reflective material). The reflective material may be used to reflect light onto photovoltaic cells on a bottom surface of the solar panels. In fact, the solar panels may be double-sided solar panels having photovoltaic cells on an upper surface and the bottom surface.

In some example implementations, the top surfaces of the plates may be curved to reflect light on the bottom surface of the solar panels. The curve may have a parabolic shape. The curved surfaces may be solar concentrators and may reflect a higher percentage of light beams on the solar panels than would plates with flat top surfaces.

In some example implementations, the plates may have several parabolic sections attached side-by-side to each other. Multiple sections having parabolic shapes may reflect more light on the solar panels than would flat plates.

Thus, the floating platform for solar panels of the present disclosure may be used as a float for mounting solar panels on the water surface. Additionally, the floating platform disposed in a water reservoir, such a pool, may prevent evaporation of water from the water reservoir. Therefore, owners of water reservoirs may have no need to cover the water reservoirs in periods when the water reservoirs are not in use. Additionally, the owners of the water reservoirs may minimize costs for filling water reservoirs with water to compensate for the evaporated water.

Referring now to the drawings, FIG. 1 shows different views of a floating platform for solar panels, according to an example embodiment. Specifically, FIG. 1 shows an upper perspective view 100, a top view 102, a side view 104, a cross-section view 106, and a rear view 108 of a floating platform 110 for solar panels. The floating platform 110 may include a plurality of plates 112. Each of the plates 112 may have a ballast chamber 114 and a float chamber 116. Each of the chambers may be a hollow chamber made of a light-weight material, such as a plastic material. In other words, the plates 112 may be made of the light-weight plastic material.

The ballast chamber 114 may be filled with a ballast material. The ballast material may include one of the following: water, gravel, concrete, a combination of water and gravel, a combination of water and concrete, and the like. When filled with water, the ballast chamber 114 may serve as a water anchor. Therefore, the floating platform 110 may be self-ballasting due to the use of the ballast chamber 114 filled with the ballast material. The ballast chamber 114 may have a bottom surface 118 that may face a water surface 120 of a water reservoir (not shown) or water resources (such as seas and oceans) when the floating platform 110 is placed on the water surface 120. The float chamber 116 may be disposed over the ballast chamber 114 so as an upper surface 122 of the ballast chamber 114 may face a bottom surface 124 of the float chamber 116. The float chamber 116 may be filled with air, a polymer foam, or other light-weight material.

In an example embodiment, the ballast chamber 114 and the float chamber 116 may be molded as a single element and may have a separation wall between the ballast chamber 114 and the float chamber 116. The separation wall may be formed by an upper surface 130 of the float chamber 116 and the bottom surface 118 of the ballast chamber 114. The float chamber 116 may be sealed so that the air cannot exit the float chamber 116.

Each of the plates 112 may further include a channel 126 passing through the ballast chamber 114 and the float chamber 116. In other words, the channel 126 may be a pass-through channel having a first end 128 on the upper surface 130 of the float chamber 116 and having a second end 132 on the bottom surface 118 of the ballast chamber 114, as shown on the cross-section view 106. Each of the first end 128 and the second end 132 may be open, i.e., the first end 128 may be an opening on the upper surface 130 and the second end 132 may be an opening on the bottom surface 118. The channel 126 may have a first portion 134 and a second portion 136. The first portion 134 of the channel 126 may pass in the ballast chamber 114, and the second portion 136 of the channel 126 may pass in the float chamber 116. Moreover, the channel 126 may have one or more openings 138 in the first portion 134. Therefore, the water may pass from a water reservoir into the ballast chamber 116 through the channel 126. Specifically, the water may pass through the second end 132 of the channel 126 and through the openings 138 to flow into the ballast chamber 116.

The first end 128 of the channel 126 may be used to allow passing air from the channel 128. Specifically, when the water enters the ballast chamber 116 by passing through the openings 138, the air may exit the ballast chamber 116 by passing through the openings 138 and exiting through the first end 128 of the channel 126. The first end 128 may also serve as a drain opening to allow the water to be passed from upper surface 130 of the float chamber 116 into the channel 126. The second end 132 may also serve as a drain opening to allow the water passed into the first opening 128 to be passed through the channel 126 into the water reservoir.

The floating platform 110 may further have one or more connection sections 140. The connection sections 140 may be located on peripheral portions on at least two sides of the plates 112. The connection sections 140 may be flat and may be provided on two opposite sides of the plates 112. The connection sections 140 may be used for placing one or more strap assemblies 142 to be attached to the plates 112. The strap assemblies 142 may be used for disposing one or more solar panels 144 on the plates 112. The connection sections 140 may provide high strength in a lateral direction of the plate 112 and may allow for a reduced weight of a shell of the plates. In some example embodiments, the flat area of the connection section 140 of the plates 112 may also serve as a strap. Using the strap assemblies 142 for attaching the solar panels 144 to the floating platform may reduce stress exerted by the weight of the solar panels 144 on the connection sections 140.

The connection sections 140 may have channels 160 for attaching the strap assemblies 142 to the connection sections 140. Specifically, the channels 160 may be used for attaching straps, strap connectors, connection brackets, and the like. The channels 160 may be built-in molded channels in the connection sections 140. In some embodiments, one channel 160 may be provided on each end of each connection section 140 of the plate 112.

The floating platform 110 may further have a locking member 146 on side portions 154 of the plates 112. The upper surface 130 of the float chamber 116 is configured to reflect light on a bottom surface of the one or more solar panels 140 installed on the plates 112. The solar panels 140 may be double-sided solar panels, i.e., the solar panels 140 may have photovoltaic cells on both the bottom surface and an upper surface of the solar panels 140.

In an example embodiment, each of the plates 112 may have a plurality of sections 162 disposed adjacently. Each of the sections 162 may have a parabolic shape to reflect light on the bottom surface of the solar panels 144. FIG. 1 shows an example embodiment of the floating platform 110 in which each of the plates has two sections 162 of a parabolic shape. The sections 162 of the parabolic shape may reflect more light on the bottom surface of the solar panels 144 than plates having a flat upper surface. The parabolic shape may also be used to increase the strength of the plates 112 and reduce weight of a shell of the plates 112 of the floating platform 110. Alternatively, each of the plates 112 may itself have a parabolic shape to reflect light on the bottom surface of the solar panels 144.

The floating platform 110 may further have a plurality of spacers 148. Each of the spacers 148 may be disposed between two adjacent plates 112 of the floating platform 110. The spacer 148 may have a spacer locking member 150 to connect the spacer 148 to the locking member 146 of each of the plates 112. The locking member 146 and the spacer locking member 150 may be configured to connect to each other. In an example embodiment, the locking member 146 and the spacer locking member 150 may form a dovetail joint when the spacer locking member 150 is inserted into the locking member 146. In a further example embodiment, the locking member 146 and the spacer locking member 150 may be configured in a form of a ball joint. In some embodiments, the locking member 146 may be a recess passing along the length of the side portions 154 of the plate 112, and the spacer locking member 150 may be a projection passing along the length of each of side portions of the spacer 148. The projection on the one side portion of the spacer 148 may be inserted into the recess of a first plate, and the projection on the other side portion of the spacer 148 may be inserted into the recess of a second plate.

In some embodiments, the locking member 146 and the spacer locking member 150 may connect to each other in such a way that there may be a gap 168 between the plates 112 and the spacer 148. The gap 168 may be provided for leaving the floating platform 110 open for water aeration. Additionally, the spacer 148 may be connected to the plates using the locking member 146 and the spacer locking member 150 to provide walk ways between the plates 112.

In an example embodiment, the spacer 148 may have a parabolic shape and may reflect light on the bottom surface of the solar panels 144. In fact, the spacer 148 may be configured in a form of the section 162 of the plate 112 (i.e., may have a ballast chamber and a float chamber, but may have no connection sections).

Each of the plates 112 may further have a bumper 152 on one of the side portions 156 and a receiver 158 on the opposite one of the side portions 156. The receiver 158 of one of the plates 112 may be configured to receive the bumper 156 of the other one of the plates 112. In an example embodiment, the bumper 156 and the receiver 158 may be used to align the plates 112 relative to each other. Additionally, the bumper 156 and the receiver 158 may reduce stress from movement of the floating platform 110 in all directions, thereby protecting the floating platform 110 and allowing for thermal expansion and flexibility of the plates 112 in view of water movement.

The floating platform 110 may further have the strap assemblies 142 placed on the connection sections 140. The strap assemblies 142 may include a plurality of straps 164 connected to the connection sections 140 of the plates 112. The strap assemblies 142 may further include at least one support 166 disposed on each of the straps 164.

Figure 2:
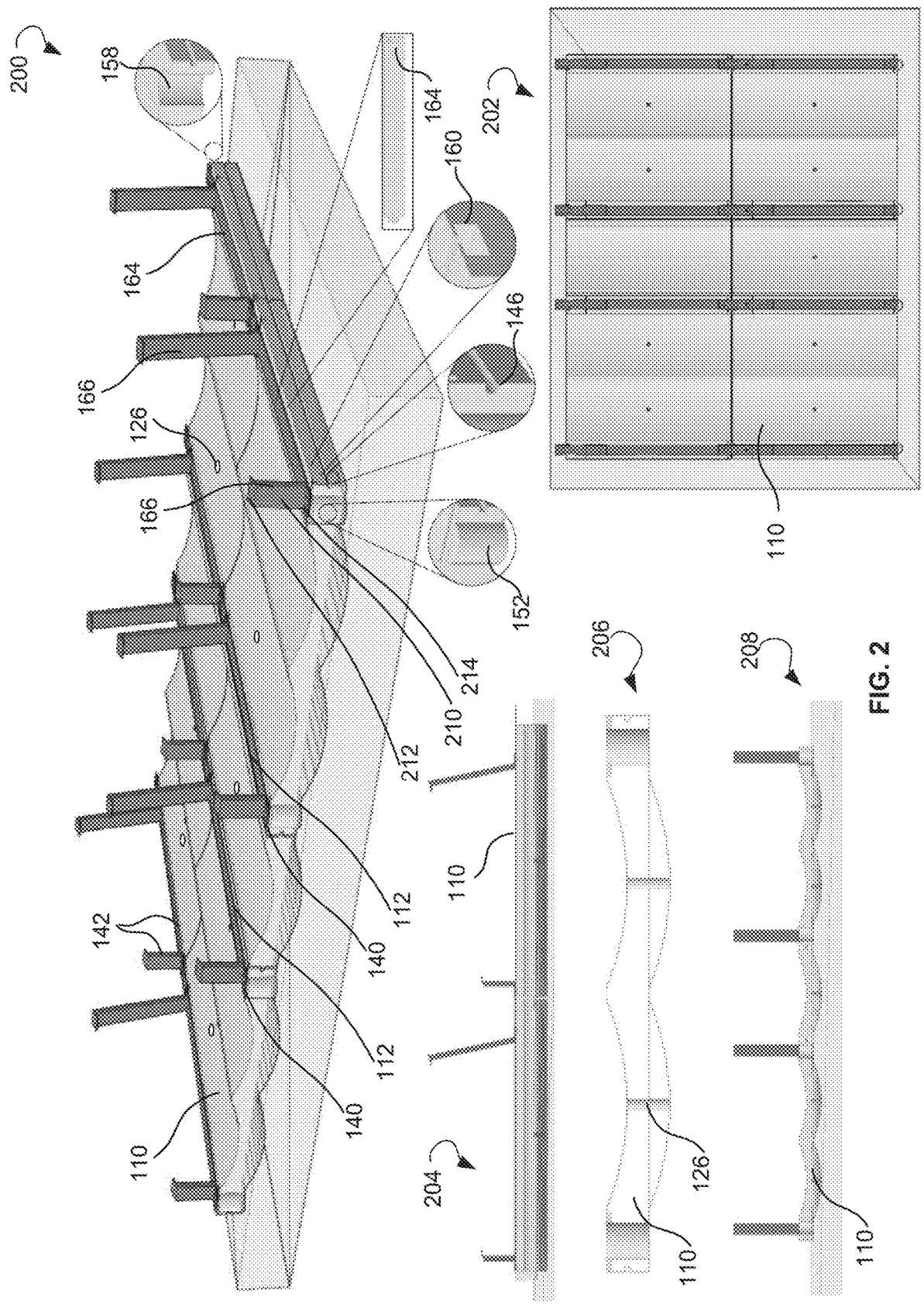
FIG. 2 shows a floating platform without solar panels, according to an example embodiment.

FIG. 2 shows different views of a floating platform without solar panels, according to an example embodiment. Specifically, FIG. 2 shows an upper perspective view 200, a top view 202, a side view 204, a cross-section view 206, and a rear view 208 of the floating platform 110.

In an example embodiment, the support 166 of the strap assemblies 142 may have a body 210, a top flange 212, and a bottom flange 214. The top flange 212 may be attached to a top end of the body 210 and the bottom flange 214 may be attached to a bottom end of the body 210. The bottom flange 214 may be attached to at least one of the straps 112. The top flange 212 may be configured to be attached to one of the solar panels. Two supports 166 may be used to mount one solar panel.

Figure 3:
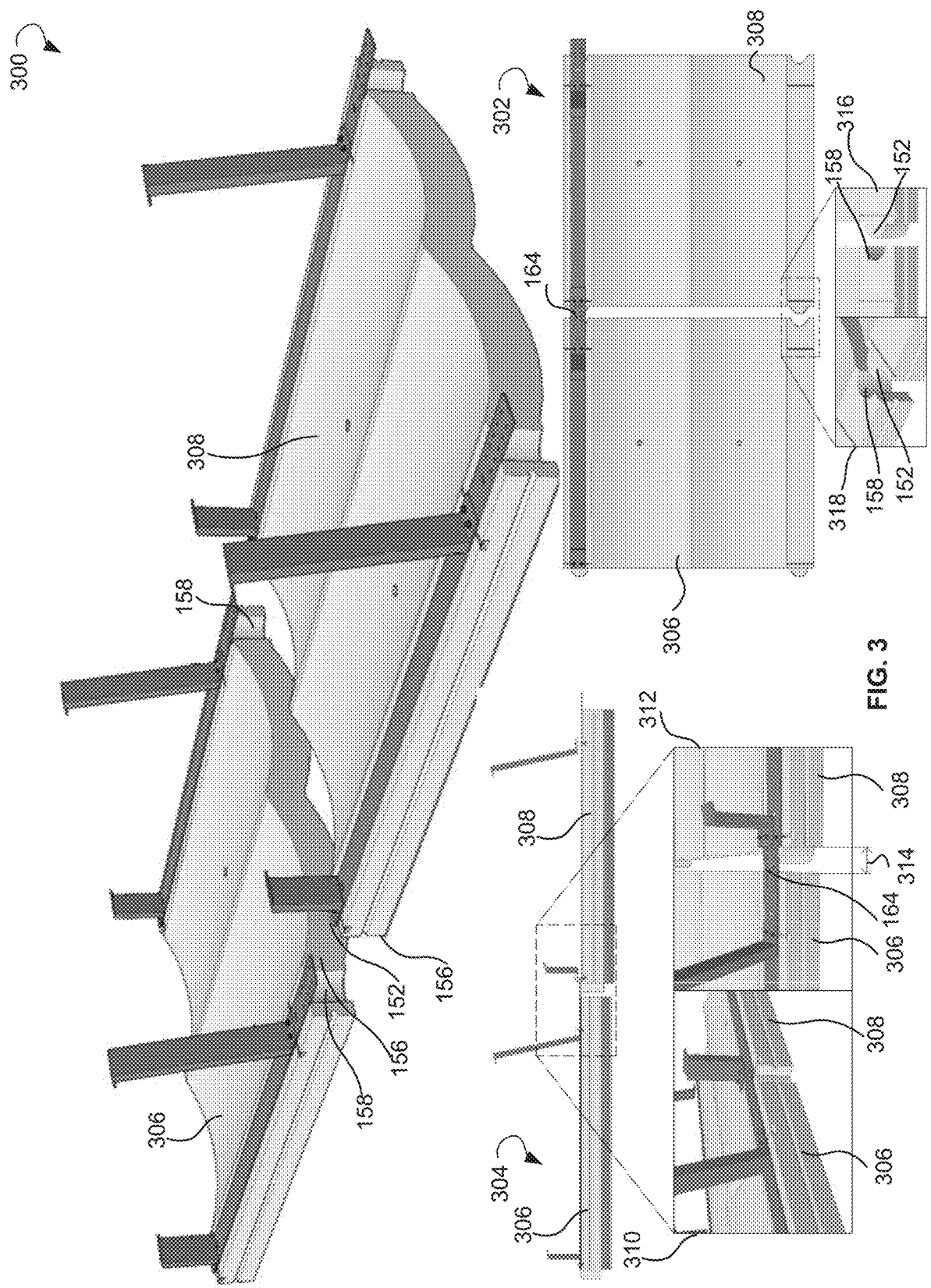
FIG. 3 shows two adjacent plates of a floating platform, according to an example embodiment.

FIG. 3 shows different views of two adjacent plates of a floating platform, according to an example embodiment. Specifically, FIG. 3 shows an upper perspective view 300, a top view 302, and a side view 304 of a plate 306 and a plate 308. As shown on the upper perspective view 300, the plate 306 and the plate 308 may be disposed opposite to each other so as bumpers 152 on a side portion 156 of the plate 308 are located in front of receivers 158 on a side portion 156 of the plate 306.

Partial views 310 and 312 of the side view 304 show the plate 306 and the plate 308 connected using a strap 164. The plate 306 and the plate 308 may be attached to each other so that a gap 314 is provided between the plate 306 and the plate 308. The gap 314 is maintained using the strap 164 connected to each of the plate 306 and the plate 308. The gap 314 may be used to avoid collisions of the plate 306 and the plate 308 when the float platform is placed into a water reservoir. Therefore, due to the presence of the gap 314, the plate 306 and the plate 308 may not damage each other. Additionally, due to the presence of the gap 314 between each two adjacent rows of plates (where the plate 306 may be in a first row of plates and the plate 308 may be in a second row of plates), the risk of damaging the float platform may be decreased because of non-rigid connections between the plates. Partial views 316 and 318 of the top view 302 show the bumpers 152 of the plate 308 located in front of the receiver 158 of the plate 306.

Figure 4:
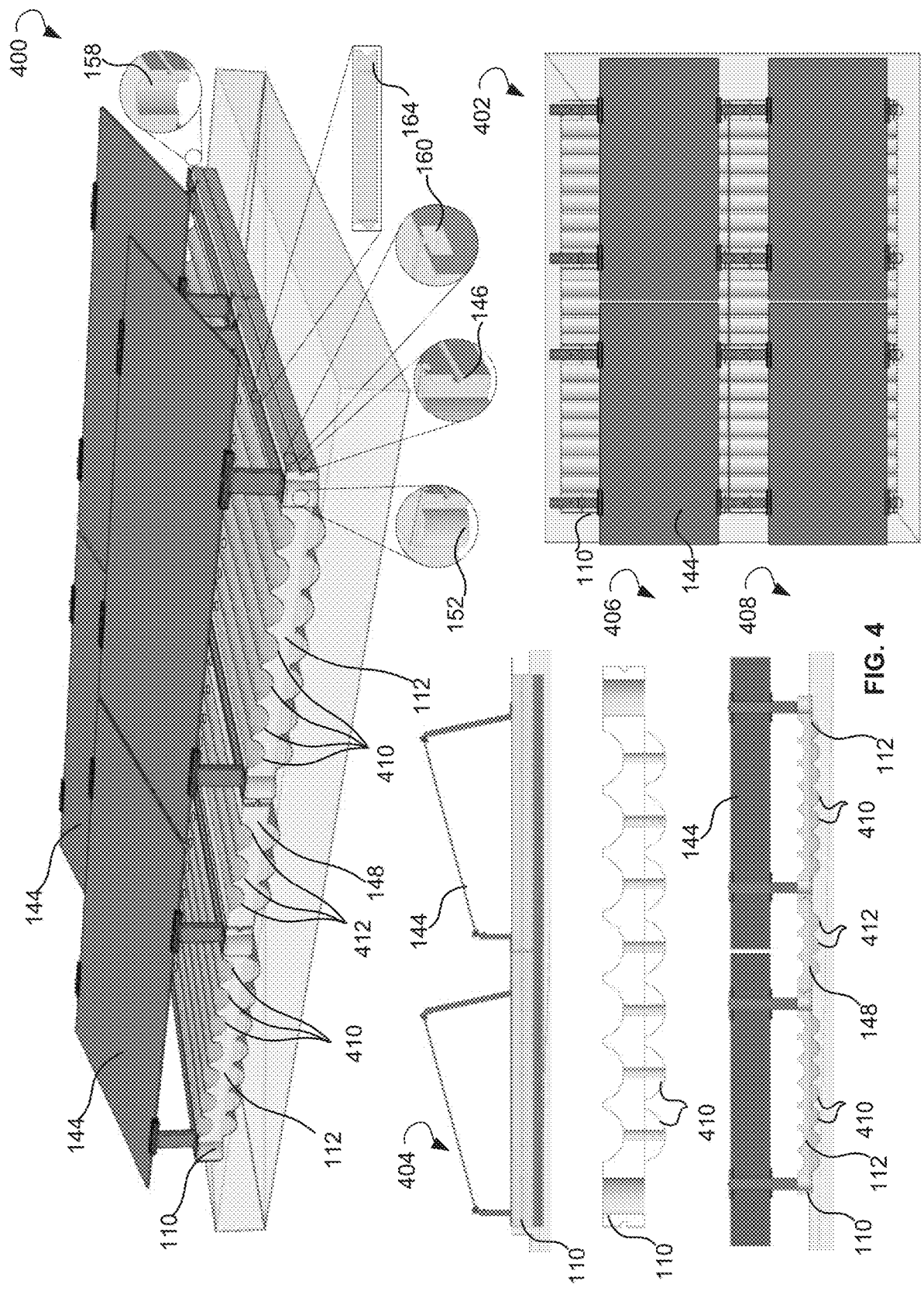
FIG. 4 shows a floating platform for solar panels, according to an example embodiment.

FIG. 4 shows a floating platform for solar panels, according to an example embodiment. Specifically, FIG. 4 shows an upper perspective view 400, a top view 402, a side view 404, a cross-section view 406, and a rear view 408 of the floating platform 110 for solar panels. FIG. 4 shows an example embodiment of the floating platform 110 in which each of the plates 112 has a plurality of sections 410 of a parabolic shape. Similarly, the spacer 148 may include a plurality of sections 412 having a parabolic shape and may reflect light on the bottom surface of the solar panels 144. The selection of a quantity of the sections 410 in the plates 112 and the sections 412 in the spacer 148 may be based on calculation of a percentage of light reflected by each of the sections 410 and the sections 412.

Figure 5:
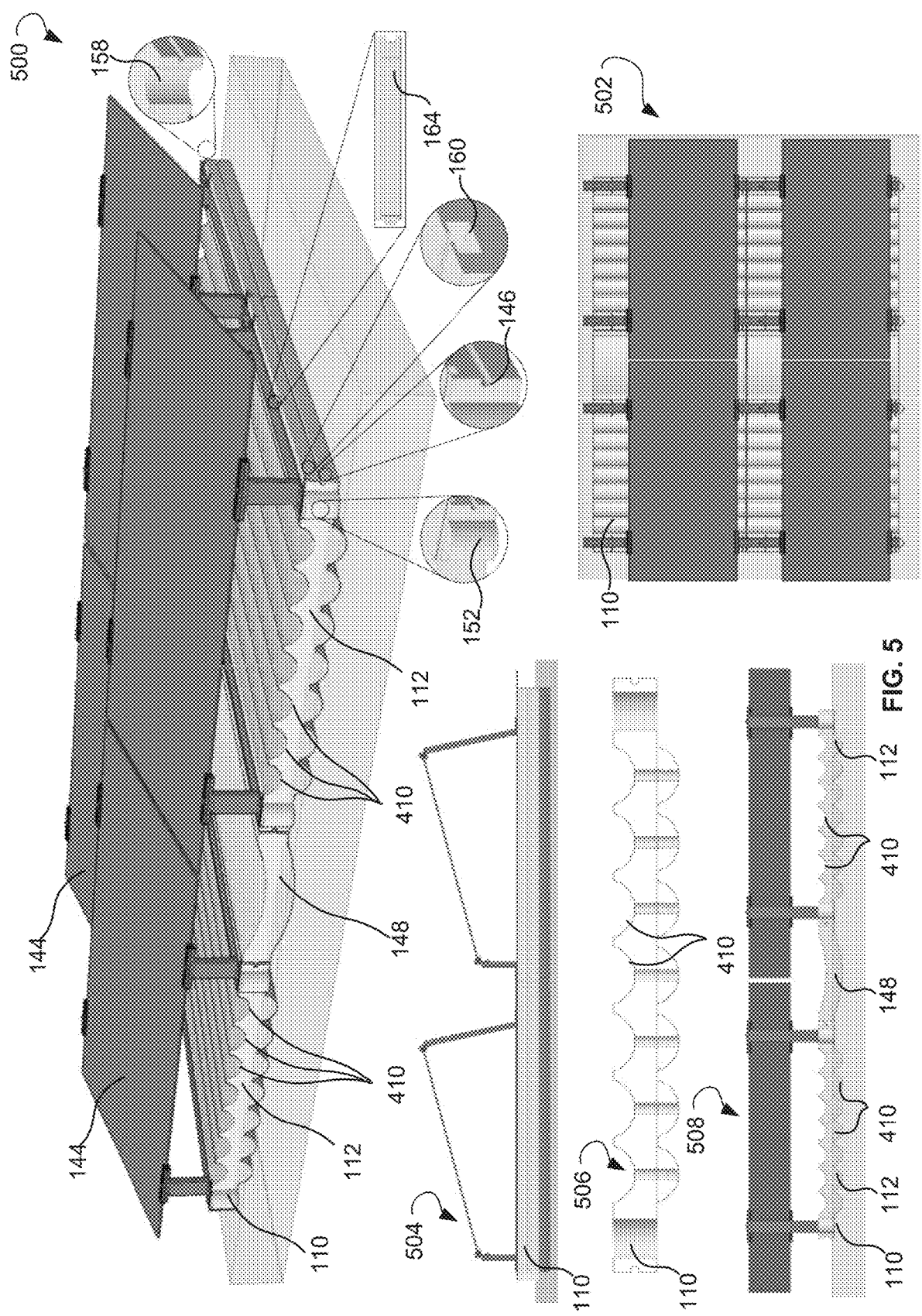
FIG. 5 shows a floating platform for solar panels, according to an example embodiment.

FIG. 5 shows a floating platform for solar panels, according to an example embodiment. Specifically, FIG. 5 shows an upper perspective view 500, a top view 502, a side view 504, a cross-section view 506, and a rear view 508 of the floating platform 110 for solar panels. FIG. 5 shows an example embodiment of the floating platform 110 in which each of the plates 112 has a plurality of sections 410 of a parabolic shape. The spacer 148 may be configured in a form of one section having a parabolic shape. The one-section spacer 148 of FIG. 5 may be used both for the plates 112 of FIG. 1 having two parabolic sections and for the plates 112 of FIG. 4 having a plurality of parabolic sections. Therefore, processes of manufacturing and assembling floating platforms having different types of plates may be simplified due to the use of the same type of spacer for different types of plates. Additionally, the size of and the quantity of sections 410 having the parabolic shape in plates 112 and spacer 148 may vary and may be selected according to a specific purpose of the floating platform 110.

Figure 6:
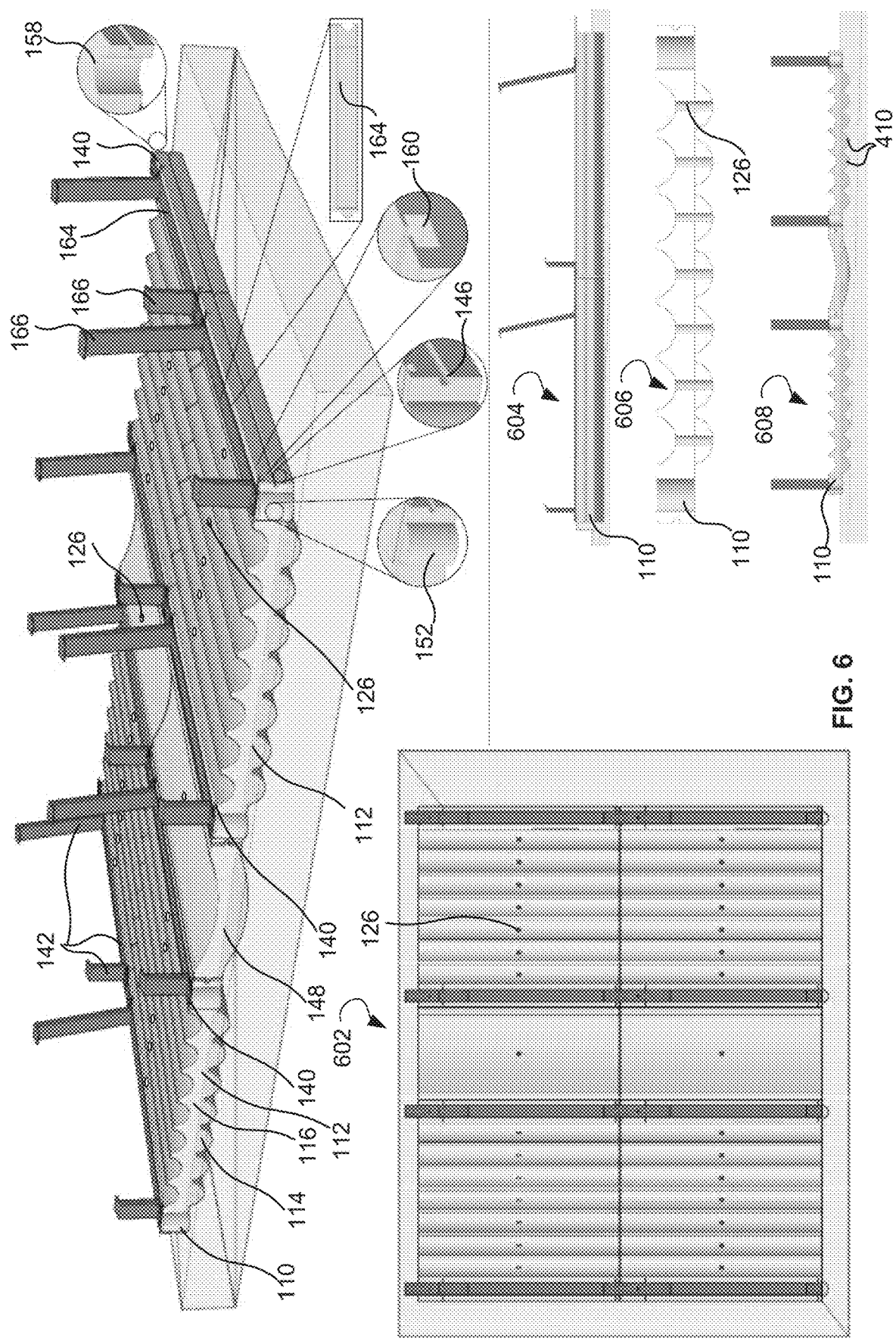
FIG. 6 shows a floating platform without solar panels, according to an example embodiment.

FIG. 6 shows a floating platform without solar panels, according to an example embodiment. Specifically, FIG. 6 shows an upper perspective view 600, a top view 602, a side view 604, a cross-section view 606, and a rear view 608 of the floating platform 110. The floating platform 110 shown on FIG. 6 is the floating platform 110 of FIG. 5 shown without solar panels.

The floating platform 110 may have the strap assemblies 142 placed on the connection sections 140 of the plates 112. The strap assemblies 142 may include a plurality of straps 164 connected to the connection sections 140 of the plates 112. The strap assemblies 142 may further include at least one support 166 disposed on each of the straps 164.

Each of the plates 112 may further include a channel 126 passing through the plates 112. In an example embodiment, each of the plates 112 may have a plurality of channels 126. Specifically, each of parabolic sections 410 of the plate 112 may have at least one channel 126. Therefore, using the channels 126 in each of the sections 410 may provide uniform filling of the ballast chamber 114 with water. The spacer 148 also may have at least one channel 126.

Figure 7:
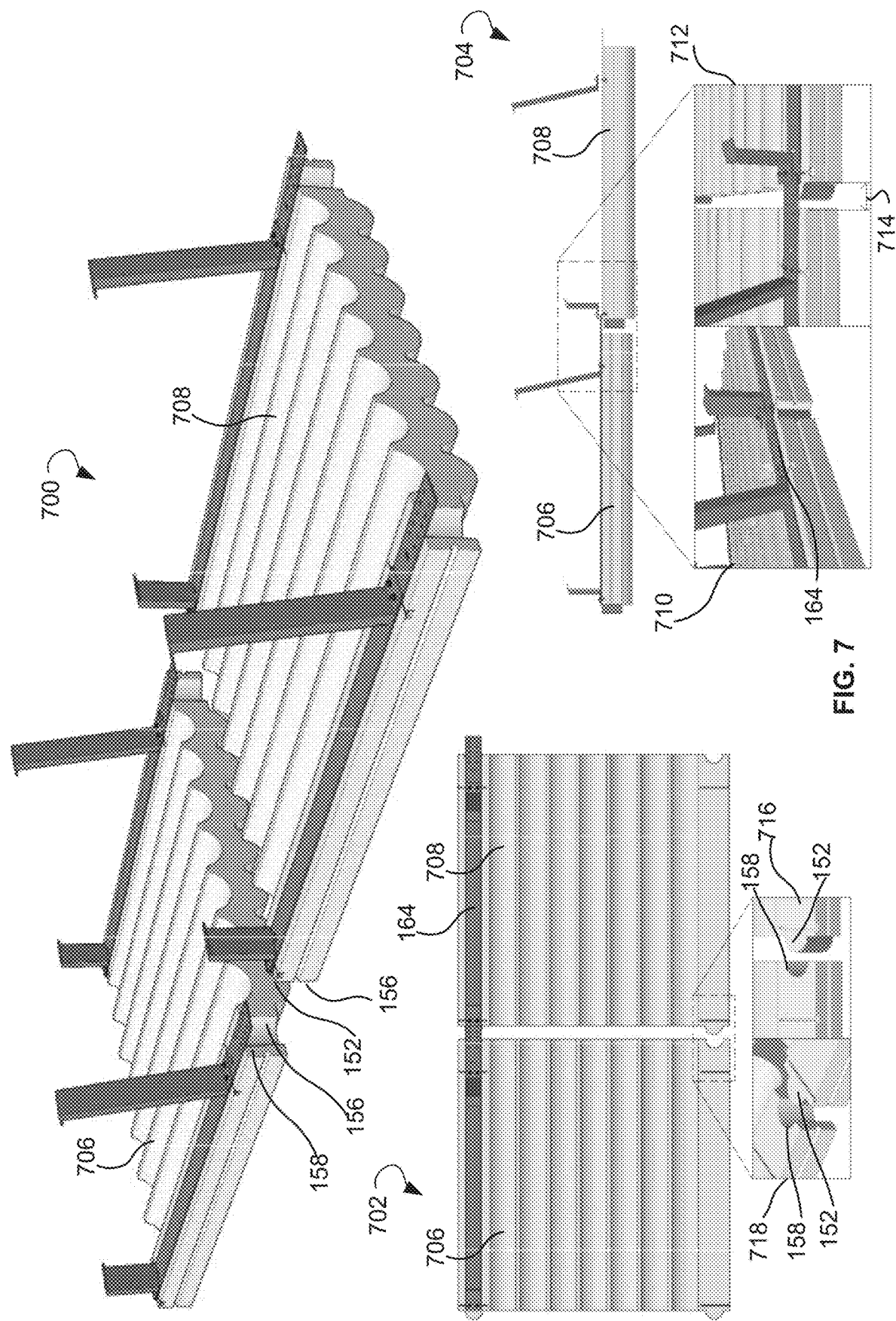
FIG. 7 shows two adjacent plates of a floating platform, according to an example embodiment.

FIG. 7 shows two adjacent plates of a floating platform, according to an example embodiment. Specifically, FIG. 7 shows an upper perspective view 700, a top view 702, and a side view 704 of a plate 706 and a plate 708. FIG. 7 is similar to FIG. 3 but shows plates that have multiple sections of a parabolic shape. As shown on the upper perspective view 700, the plate 706 and the plate 708 may be disposed opposite to each other so that bumpers 152 on a side portion 156 of the plate 708 are located in front of receivers 158 on a side portion 156 of the plate 706.

Partial views 710 and 712 of the side view 704 show the plate 706 and the plate 708 connected using a strap 164. The plate 706 and the plate 708 may be attached to each other so as there may be a gap 714 between the plate 706 and the plate 708. The gap 714 is maintained using the strap 164 connected to each of the plate 706 and the plate 708. The size of the gap 714 may be selected based on technological needs and based on the type of the strap 164. Partial views 716 and 718 on the top view 302 show the bumpers 152 of the plate 708 disposed in front of the receivers 158 of the plate 706.

Figure 8:
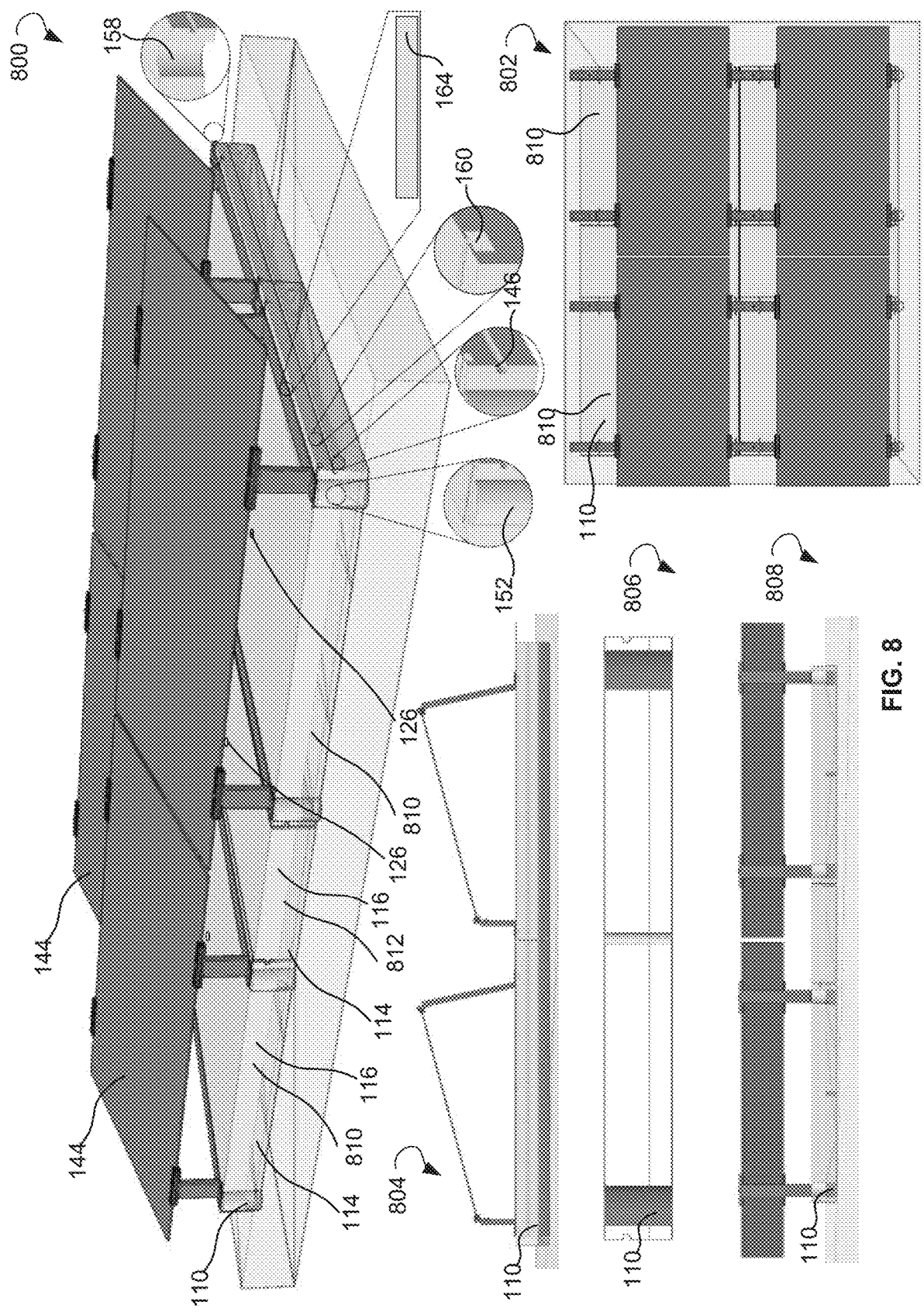
FIG. 8 shows a floating platform for solar panels, according to an example embodiment.

FIG. 8 shows a floating platform for solar panels, according to an example embodiment. Specifically, FIG. 8 shows an upper perspective view 800, a top view 802, a side view 804, a cross-section view 806, and a rear view 808 of the floating platform 110 for solar panels. FIG. 8 shows an example embodiment of the floating platform 110 in which each of plates 810 is flat. Each of the plates 810 may have a ballast chamber 114 and a floating section 116. The floating platform 110 may further have a spacer 812. The spacer 812 may also be flat. Similar to the plates 810, the spacer 812 may have a ballast chamber 114 and a floating section 116. The flat surface of plates 810 and the spacer 812 may reflect light on a bottom surface of the solar panels 144.

Each of the plates 810 and the spacer 812 may have one or more channels 126 to allow passing water into the plates 810 and the spacer 812, respectively. The number and a place of disposition of the channels 126 on the plates 810 and the spacer 810 may be selected based on a manufacturing strategy to provide uniform filling of the ballast chamber 114 with water.

Figure 9:
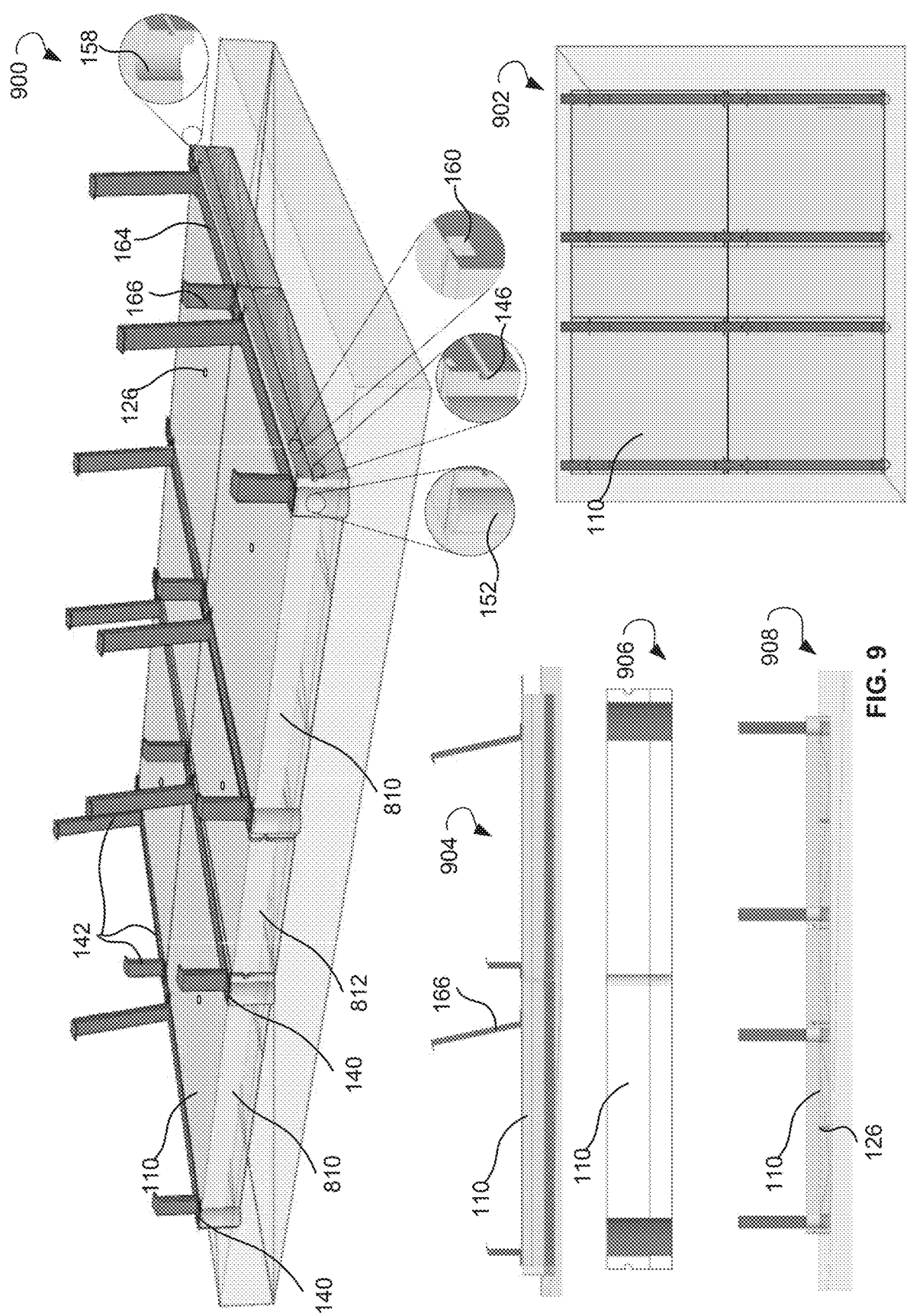
FIG. 9 shows a floating platform without solar panels, according to an example embodiment.

FIG. 9 shows a floating platform without solar panels, according to an example embodiment. Specifically, FIG. 9 shows an upper perspective view 900, a top view 902, a side view 904, a cross-section view 906, and a rear view 908 of the floating platform 110. The floating platform 110 shown on FIG. 9 is the floating platform 110 of FIG. 8 shown without solar panels.

FIG. 9 shows strap assemblies 142 used to attach solar panels to plates 810. The strap assemblies 142 may be placed on connection sections 140 of the plates 810. The strap assemblies 142 may include a plurality of straps 164 connected to the connection sections 140 of the plates 810. The strap assemblies 142 may further include at least one support 166 disposed on each of the straps 164. In some example embodiments, two supports 166 on each connection section 140 of the plate 810 may be used to mount the solar panel. Therefore, four supports 166 (two on each connection section 140 of the plate 810) may be used to mount one solar panel on the plate 810.

Figure 10:
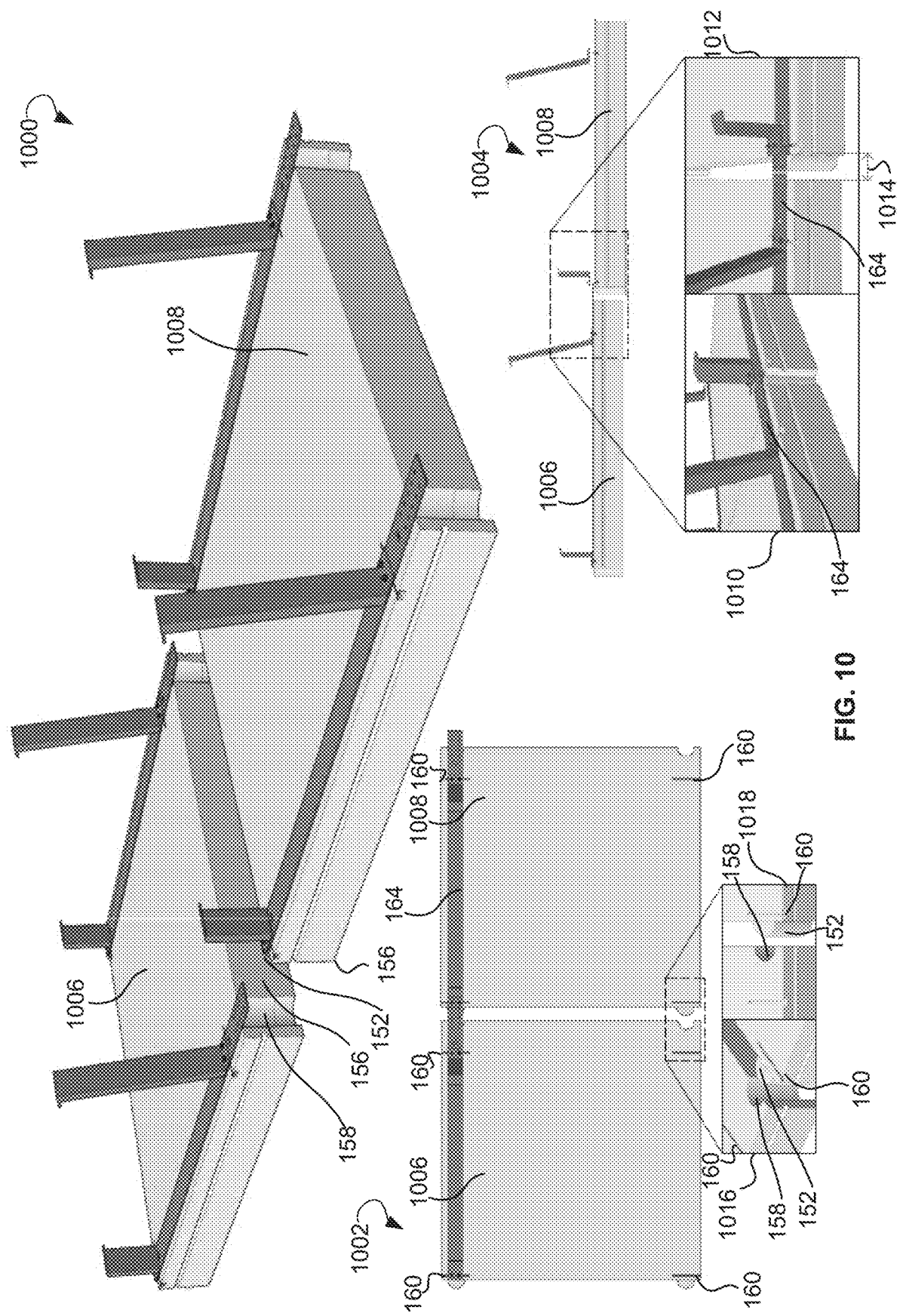
FIG. 10 shows two adjacent plates of a floating platform, according to an example embodiment.

FIG. 10 shows two adjacent plates of a floating platform, according to an example embodiment. Specifically, FIG. 10 shows an upper perspective view 1000, a top view 1002, and a side view 1004 of a plate 1006 and a plate 1008. FIG. 10 is similar to FIG. 7 but shows plates 1006 and 1008 that are flat. As shown on the upper perspective view 1000, the plate 1006 and the plate 1008 may be disposed opposite to each other so that bumpers 152 on a side portion 156 of the plate 1008 are located in front of receivers 158 on a side portion 156 of the plate 1006.

Partial views 1010 and 1012 of the side view 1004 show the plate 1006 and the plate 1008 connected using a strap 164. The plate 1006 and the plate 1008 may be attached to each other so that there may be a gap 1014 between the plate 1006 and the plate 1008. Partial views 1016 and 1018 on the top view 1002 show the bumpers 152 of the plate 1008 disposed in front of the receivers 158 of the plate 1006. Partial views 1016 and 1018 show a channel 160 on the plate 1008 for attaching the straps 164 to the plate 1008. As shown on the top view 1002, each of the plate 1006 and plate 1008 may have at least two channels 160 used for attaching the straps 164.

Figure 11A:
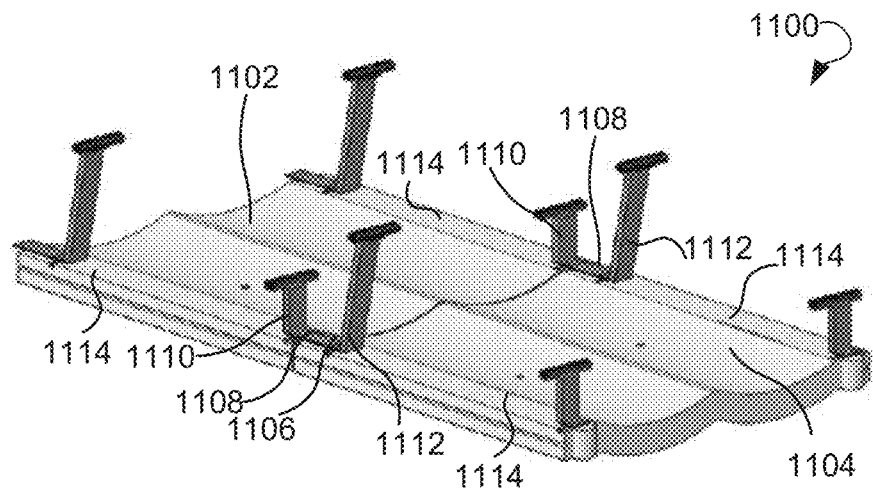
FIG. 11A shows a general view of plates connected by strap assemblies, according to an example embodiment.

FIG. 11A shows a general view 1100 of plates connected by strap assemblies, according to an example embodiment. FIG. 11A shows a plate 1102 connected to a plate 1104 using a strap assembly 1106. Each of the plates 1102 and 1104 has two connection sections 1114 disposed on two opposite sides of the plates 1102 and 1104. The strap assembly 1106 includes a strap 1108, a first support 1110, and a second support 1112. The strap 1008 is used to connect the plate 1102 and the plate 1104 to each other. The strap 1108 is connected to the plates 1102 and 1104 using fasteners (not shown). The first support 1110 may be connected to a first end of the strap 1108 and to the plate 1102. The second support 1112 may be connected a second end of the strap 1108 and to the plate 1104. The first support 1110 and the second support 1112 are connected to the strap 1108 and to the plates 1102 and 1104, respectively, using fasteners (not shown). As shown on FIG. 11A, the strap 1108 covers only a portion of the connection sections 1114; namely, the strap 1108 is disposed only at one end of each of plates 1102 and 1104 to provide connection of the plates 1102 and 1104.

Figure 11B:
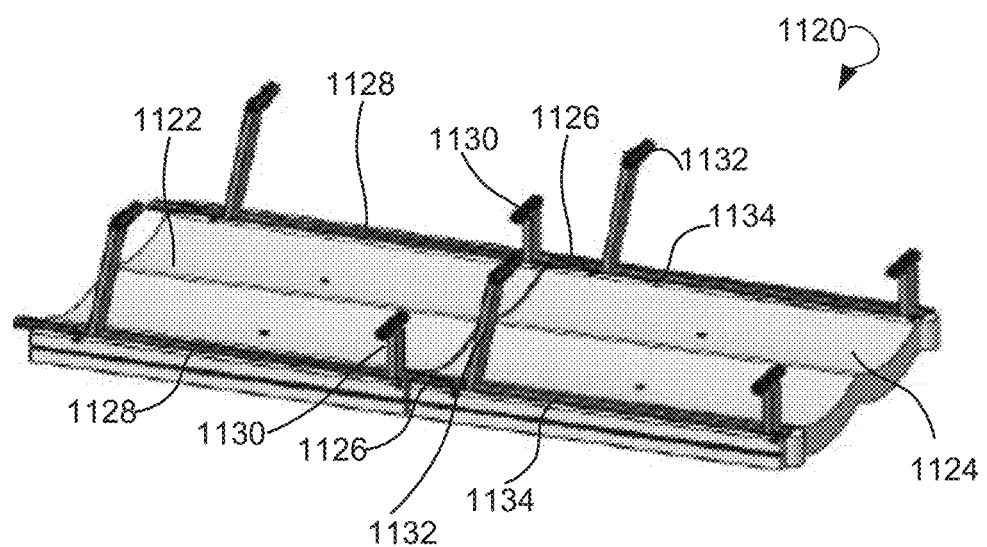
FIG. 11B shows a general view of plates connected by strap assemblies, according to another example embodiment.

FIG. 11B shows a general view 1120 of plates connected by strap assemblies, according to another example embodiment. FIG. 11B shows a plate 1122 connected to a plate 1124 using a strap assembly 1126. Each of the plates 1122 and 1124 has two connection sections 1134 disposed on two opposite sides of the plates 1122 and 1124. The strap assembly 1126 includes a strap 1128, a first support 1130, and a second support 1132. The strap 1128 is used to connect the plate 1122 and the plate 1124 to each other. The strap 1102 is connected to the plates 1122 and 1124 using fasteners (not shown). The first support 1130 and the second support 1132 are connected to the strap 1128 and to the plates 1122 and 1124, respectively, using fasteners (not shown). As shown on FIG. 11B, the strap 1128 completely covers the connection sections 1134; namely, the strap 1128 goes between two ends of each of plates 1122 and 1124 to provide connection of the plates 1122 and 1124.

Figure 12:
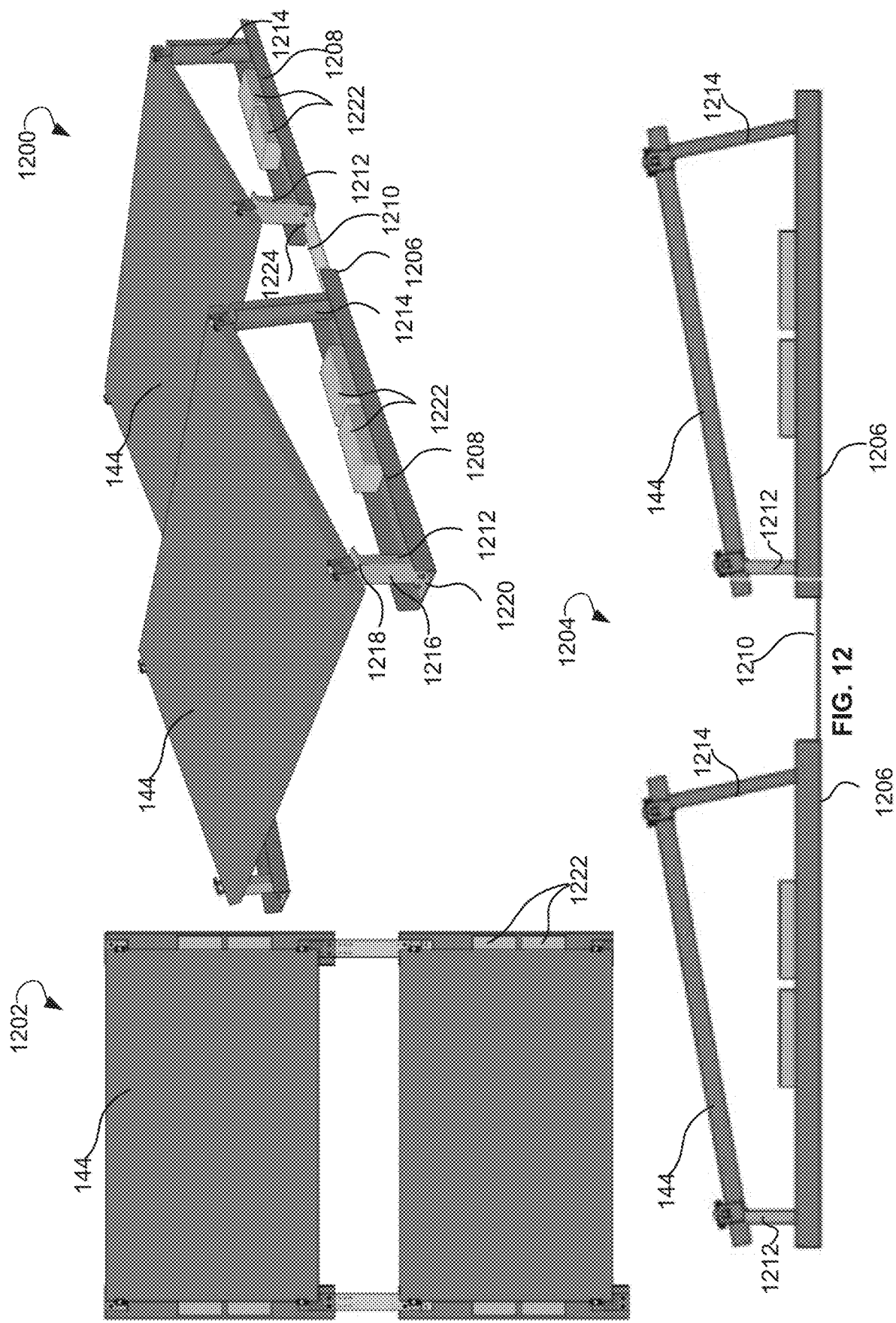
FIG. 12 shows strap assemblies, according to an example embodiment.

FIG. 12 shows strap assemblies, according to an example embodiment. Specifically, FIG. 12 shows an upper perspective view 1200, a top view 1202, and a side view 1204 of strap assemblies 1206. The strap assembly 1206 may include a plurality of straps and a plurality of supports. Specifically, the strap assembly 1206 may include a ballast tray 1208, a strap 1210, a support 1212, and a support 1214. Each of the support 1212 and 1214 may have a body 1216 having a top end and a bottom end, a top flange 1218 attached to the top end of the body 1216, and a bottom flange 1220 attached to the bottom end of the body 1216. The body 1216 may have a cross section selected from a C-shaped cross-section, a Z-shaped cross-section, an I-shaped cross section, and so forth. The bottom flange 1220 may be attached to the ballast tray 1208 using fasteners. The top flange 1218 may be attached to the solar panel using fasteners.

The strap assembly 1206 may further include a ballast 1222. The ballast 1222 may be used to hold the ballast tray 1208 down. The ballast 1222 can be any element made of a weighty material. The ballast 1222 may include bricks, blocks of concrete, blocks of metal, and so forth. The ballast 1222 may be contained within the ballast tray 1208. In an example embodiment, the ballast tray 1208 may be a strap that has vertical side walls, namely, two vertical side walls, so that the ballast 1222 may be placed between the vertical side walls of the ballast tray 1208. The ballast 1222 may be just placed on the ballast trays 1208 or may also be fastened to the ballast trays 1208. The ballast tray 1208 may serve as a container for the ballast 1222. Any number of ballasts 1222 can be used in the strap assembly 1206.

Figure 13:
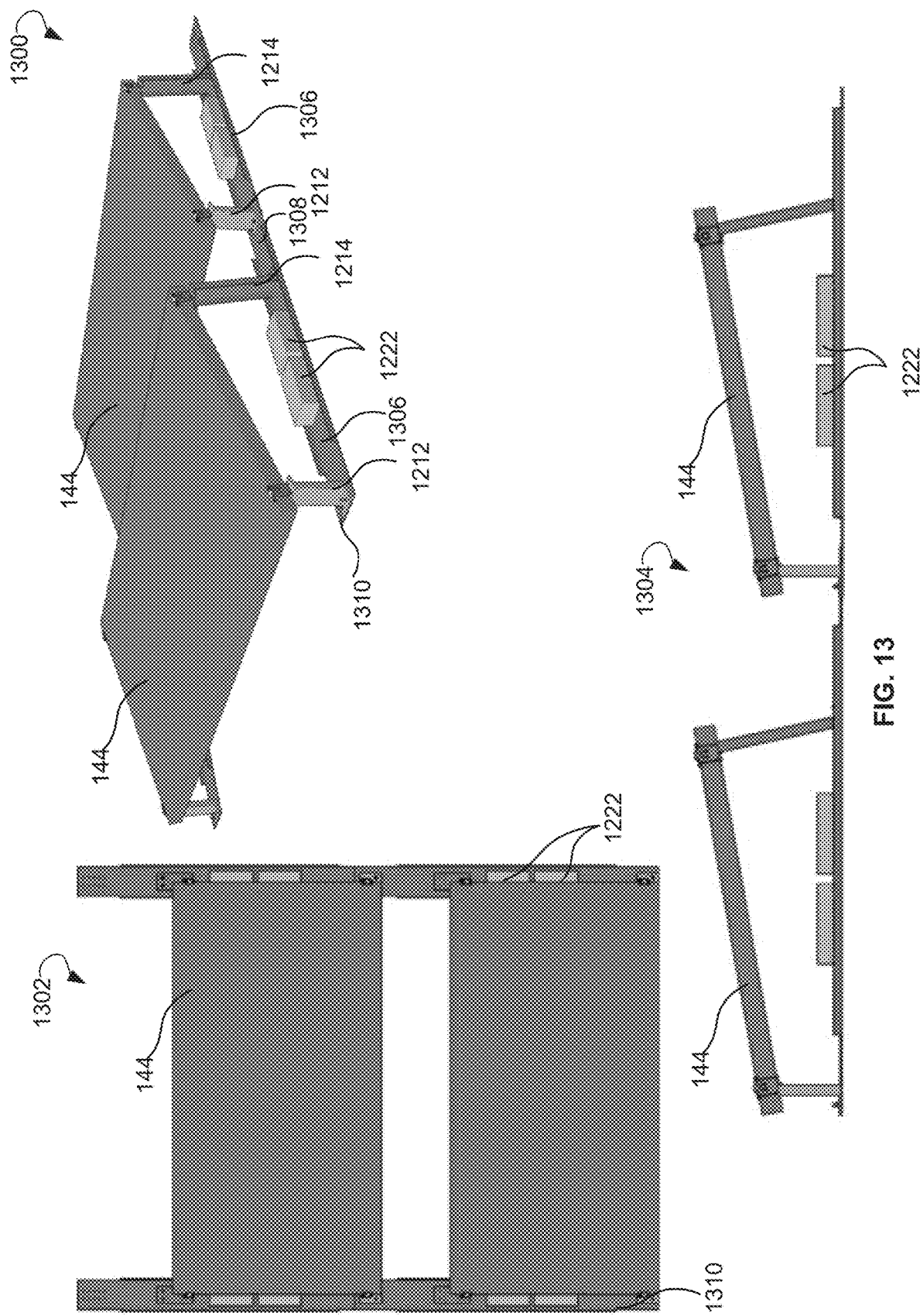
FIG. 13 shows strap assemblies, according to an example embodiment.

FIG. 13 shows strap assemblies, according to an example embodiment. Specifically, FIG. 13 shows an upper perspective view 1300, a top view 1302, and a side view 1304 of strap assemblies 1310. The strap assembly 1310 may include a plurality of straps and a plurality of supports. Specifically, the strap assembly 1310 may include a ballast tray 1306, a strap 1308, a support 1212, and a support 1214. As can be seen on FIG. 13, the strap 1308 may differ from the strap 1210 shown on FIG. 12, and the ballast tray 1306 may differ from the ballast tray 1208 shown on FIG. 12. Specifically, the strap 1308 may be wider than the strap 1210. The ballast tray 1306 may have lower side walls than the ballast tray 1208. The strap assembly 1310 may further include a ballast 1222. The ballast 1222 may be disposed on the ballast tray 1306. The ballast tray 1306 may serve as a container for the ballast 1222.

Figure 14:
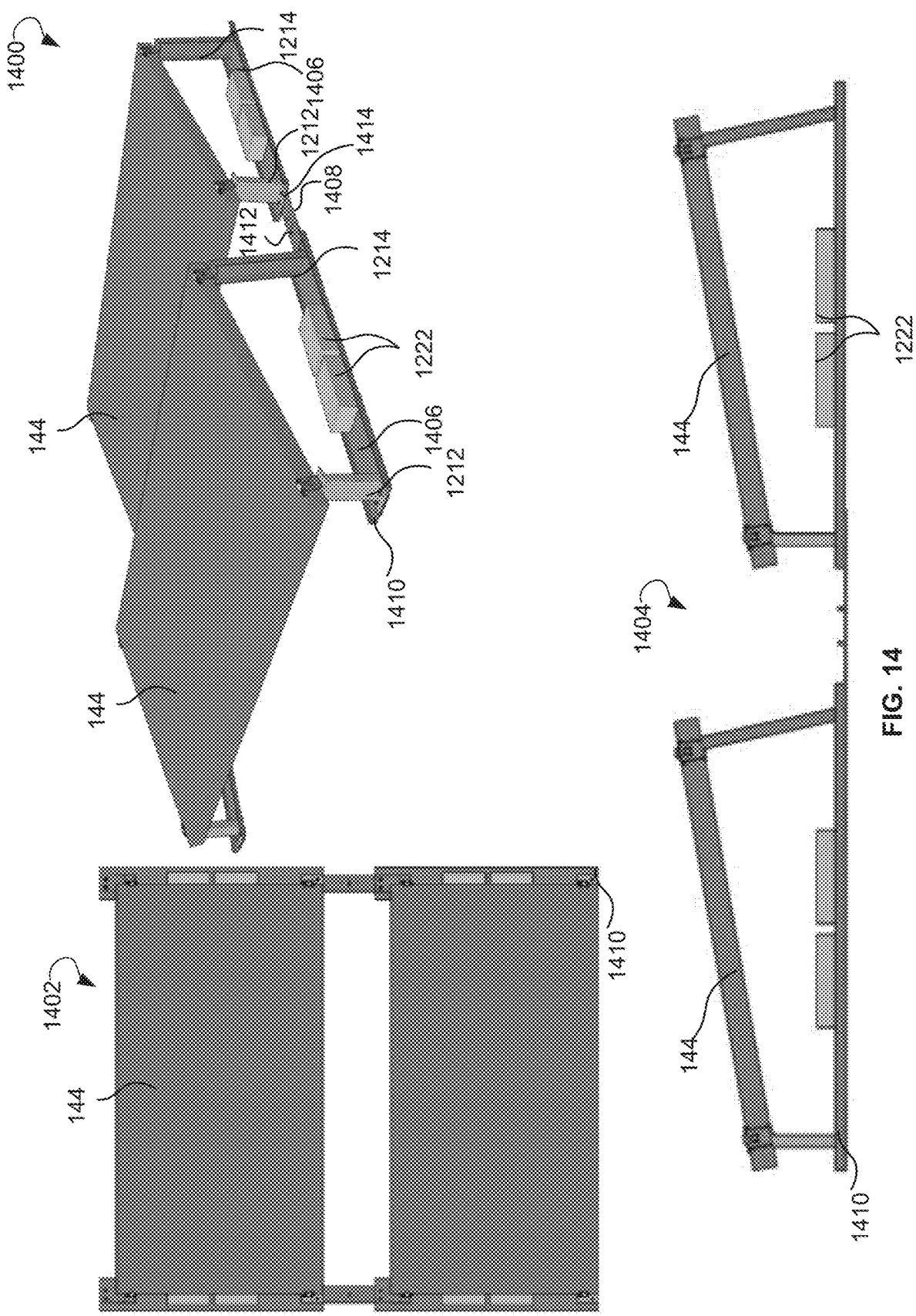
FIG. 14 shows strap assemblies, according to an example embodiment.

FIG. 14 shows strap assemblies, according to an example embodiment. Specifically, FIG. 14 shows an upper perspective view 1400, a top view 1402, and a side view 1404 of strap assemblies 1410. The strap assembly 1410 may include a plurality of straps and a plurality of supports. Specifically, the strap assembly 1410 may include a ballast tray 1406, a strap 1408, a support 1212, and a support 1214. As can be seen on FIG. 14, the strap 1408 may differ from the strap 1210 shown on FIG. 12, and the ballast tray 1406 may differ from the ballast tray 1306 shown on FIG. 13. Specifically, the strap 1408 may be connected to the plate using fasteners 1412, as well as may be connected to the plate using fasteners 1414 used for connecting the support 1212 to the ballast tray 1406. The strap 1210 shown on FIG. 12 may be connected using fasteners 1224 used for connecting the support 1212 to the ballast tray 1208. The ballast tray 1406 may have side walls along the whole length of the ballast tray 1406, while the ballast tray 1306 shown on FIG. 13 may have vertical walls only along a portion of the ballast tray 1306, namely, along in a central section of the ballast tray 1306. The strap assembly 1410 may further include a ballast 1222. The ballast 1222 may be disposed on the ballast tray 1406. The ballast tray 1406 may serve as a container for the ballast 1222.

Figure 15:
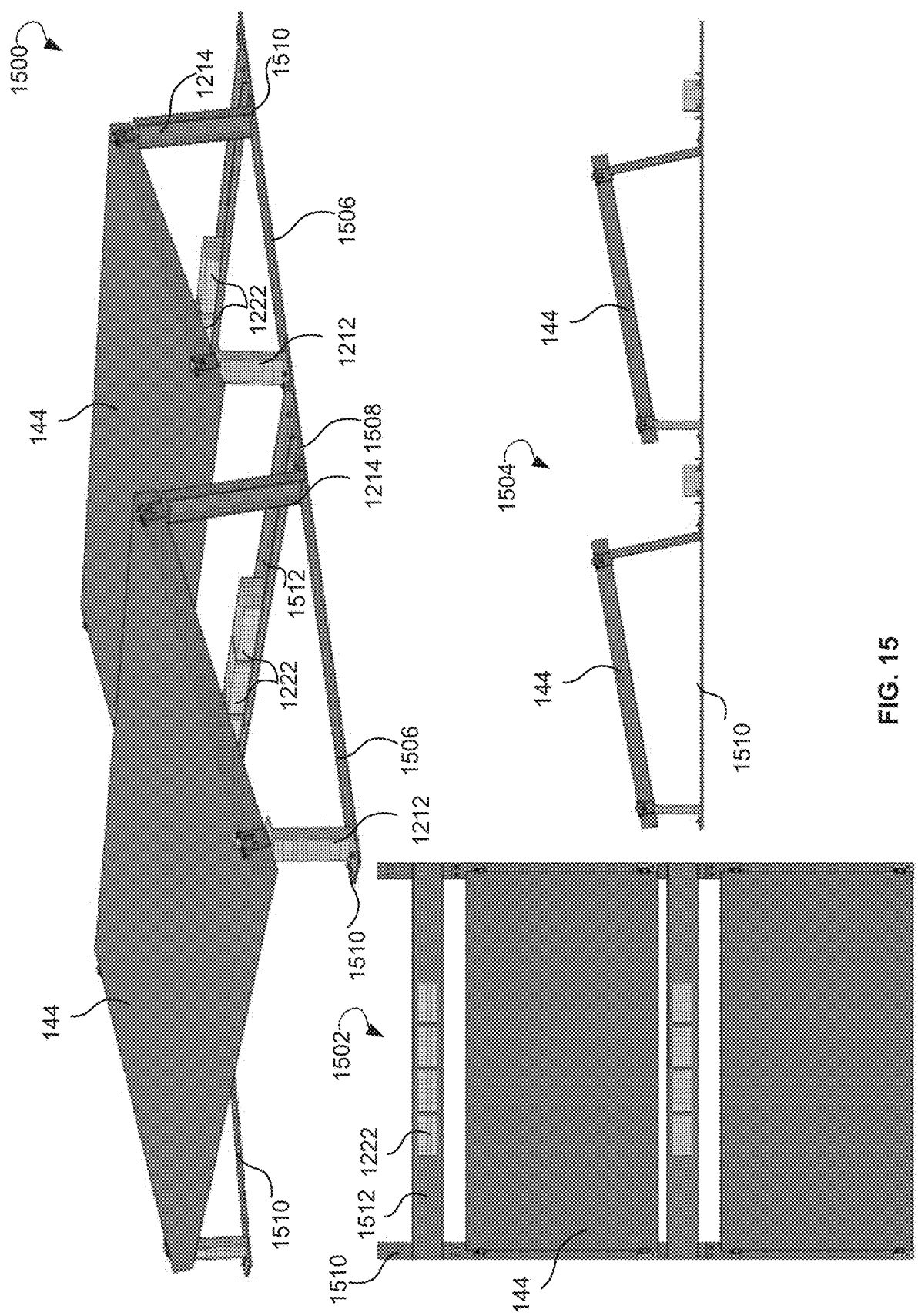
FIG. 15 shows strap assemblies, according to an example embodiment.

FIG. 15 shows strap assemblies, according to an example embodiment. Specifically, FIG. 15 shows an upper perspective view 1500, a top view 1502, and a side view 1504 of strap assemblies 1510. The strap assembly 1510 may include a plurality of straps and a plurality of supports. Specifically, the strap assembly 1510 may include a strap 1506, a strap 1508, a ballast tray 1512, a support 1212, and a support 1214. The strap assembly 1510 may further include a ballast 1222. The ballast 1222 may be disposed on the ballast tray 1512. The ballast tray 1512 may serve as a container for the ballast 1222. The ballast tray 1512 may be disposed perpendicularly to the strap 1506. Additionally, the ballast tray 1512 may be placed between the strap assembly 1510 of a first plate and the strap assembly 1510 of a second plate to span the distance between the strap assemblies 1510.

FIG. 16 is a flow diagram showing a method 1600 for manufacturing a floating platform for solar panels, according to an example embodiment. The method 1600 may commence with providing a plurality of plates 112. Specifically, the providing of the plurality of plates 112 may include providing, on each of the plurality of plates, a ballast chamber 114 at operation 1602. The ballast chamber 114 may be filled with a ballast material and may have a bottom surface to be faced to a water surface. The method 1600 may continue with operation 1604, at which a float chamber 116 is provided on each of the plurality of plates 112 so as the float chamber 116 is disposed over the ballast chamber 114. At operation 1606, a channel 126 passing through the ballast chamber 114 and the float chamber 116 may be provided on each of the plurality of plates 112. The channel 126 may have a first portion 134 passing in the ballast chamber 114 and a second portion 136 passing in the float chamber 116. Furthermore, the channel 126 may have one or more openings in the first section 114 to pass water into the ballast chamber and an opening in the second portion to pass air from the channel 126. At operation 1608, one or more connection sections 140 are provided on each of the plurality of plates 112. The connection sections 140 are used for placing one or more strap assemblies 142 to be attached to the plurality of plates 112. The one or more strap assemblies 142 may be provided for disposing one or more solar panels 144 on the plurality of plates 112. The method 1600 may continue with operation 1610, at which the plurality of plates 112 are connected to each other using a locking member 146 provided on one or more side portions 154 of the plurality of plates 112.

The method 1600 may further include providing the one or more strap assemblies 142 placed on the one or more connection sections 140. Specifically, the providing of the one or more strap assemblies 142 may include providing a plurality of straps 164 connected to the one or more connection sections 140 of the plurality of plates 112. Additionally, at least one support 166 may be provided and disposed on each of the plurality of straps 164. The least one support 166 may have a body 210 having a top end and a bottom end, a top flange 212 attached to the top end of the body 210, and a bottom flange 214 attached to the bottom end of the body 210. The bottom flange 214 may be attached (e.g., using fasteners) to at least one of the plurality of straps 164. The top flange 212 may be attached (e.g., using fasteners) to one of the one or more solar panels 144.

In an example embodiment, the method 1600 may further include providing a bumper 152 on one of the one or more side portions 156 and a receiver 158 on one of the one or more side portions 156 of each of the plurality of plates 112. The bumper 152 of a first of the plurality of plates 112 may be placed into the receiver 158 of a second of the plurality of plates 112. In some example embodiments, a gap 314 may be present between the bumper 152 and the receiver 158 when the bumper 152 is placed into the receiver 158.

In an example embodiment, the method 1600 may further include providing a plurality of spacers 148. Specifically, the connecting of the plurality of plates 112 in this embodiment may include disposing each of the plurality of spacers 148 between two adjacent plates 112 of the plurality of plates 112 and connecting each of the plurality of spacers 148 to two adjacent plates 112. Each of the spacers 148 may have a spacer locking member 150 to connect the spacer 148 to the locking member 146 of each of the plurality of plates 112.

Figure 17A:
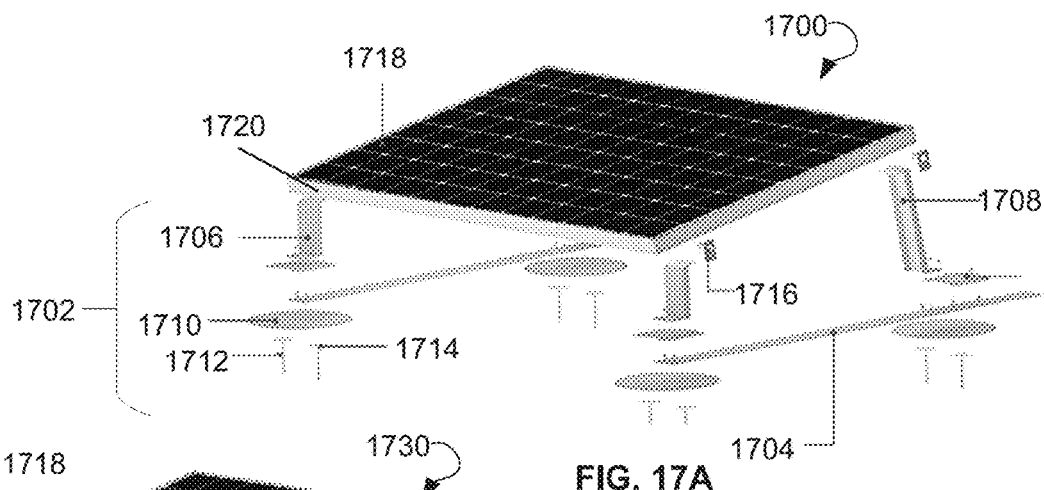
FIGS. 17A-17C show combinations of strap assemblies for connecting solar panels, according to an example embodiment.
Figure 17B:
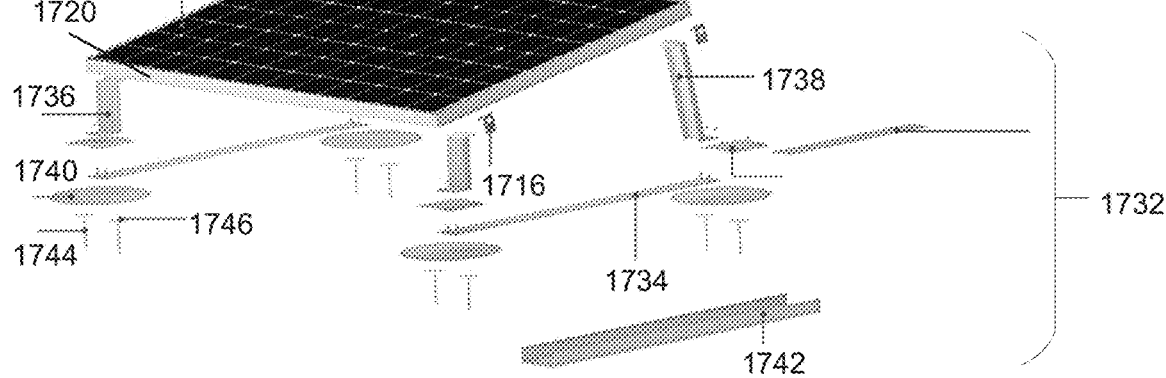
Figure 17C:
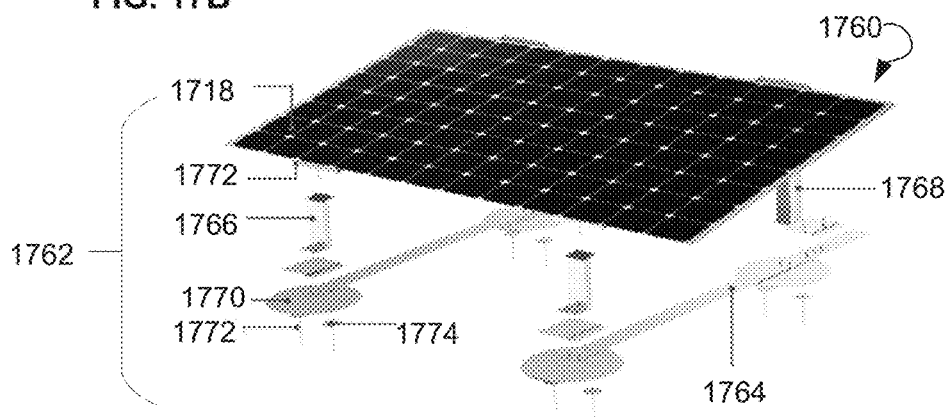

FIGS. 17A-17C show combinations of strap assemblies for connecting solar panels, according to an example embodiment. The strap assemblies shown on FIGS. 17A-17C are fast and easy to install with minor field measurements required. Specifically, FIG. 17A shows an exploded view 1700 of a three-piece strap assembly system. A strap assembly 1702 may be used for attaching a solar panel 1718 to a floating platform (not shown). The solar panel 1718 may have a frame 1720. The strap assembly 1702 may include a strap 1704, two supports, namely a first support 1706 and a second support 1708, and a single ply cap 1710. The first support 1706 may be shorter than the second support 1708 to provide an inclined positioning of the solar panel 1718. Fasteners 1712 and anchor plates 1714 may be used for connecting the strap assembly 1702 to the floating platform. A conductive end clamp 1716 may be used for connecting the solar panel 1718 to the strap assembly 1702.

FIG. 17B shows an exploded view 1730 of a four-piece strap assembly system. A strap assembly 1732 may be used for attaching a solar panel 1718 to a floating platform (not shown). The solar panel 1718 may have a frame 1720. The strap assembly 1732 may include a strap 1734, two supports, namely a first support 1736 and a second support 1738, a single ply cap 1740, and a ballast tray 1742. In an example embodiment, the ballast tray 1742 may be used for disposing a ballast (not shown) to hold down the strap 1734. The first support 1736 may be shorter than the second support 1738 to provide an inclined positioning of the solar panel 1718. Fasteners 1744 and anchor plates 1746 may be used for connecting the strap assembly 1732 to the floating platform. A conductive end clamp 1716 may be used for connecting the solar panel 1718 to the strap assembly 1732.

FIG. 17C shows an exploded view 1760 of a strap assembly system for attaching a frameless solar panel. A strap assembly 1762 may be used for attaching a solar panel 1718 to a floating platform (not shown). The solar panel 1718 may be frameless. The strap assembly 1732 may include a strap 1764, two supports, namely a first support 1766 and a second support 1768, and a single ply cap 1770. The first support 1766 may be shorter than the second support 1768 to provide an inclined positioning of the solar panel 1718. Fasteners 1772 and anchor plates 1774 may be used for connecting the strap assembly 1762 to the floating platform. A frameless clamp 1776 may be used for connecting the solar panel 1718 to the strap assembly 1762.

Figure 18:
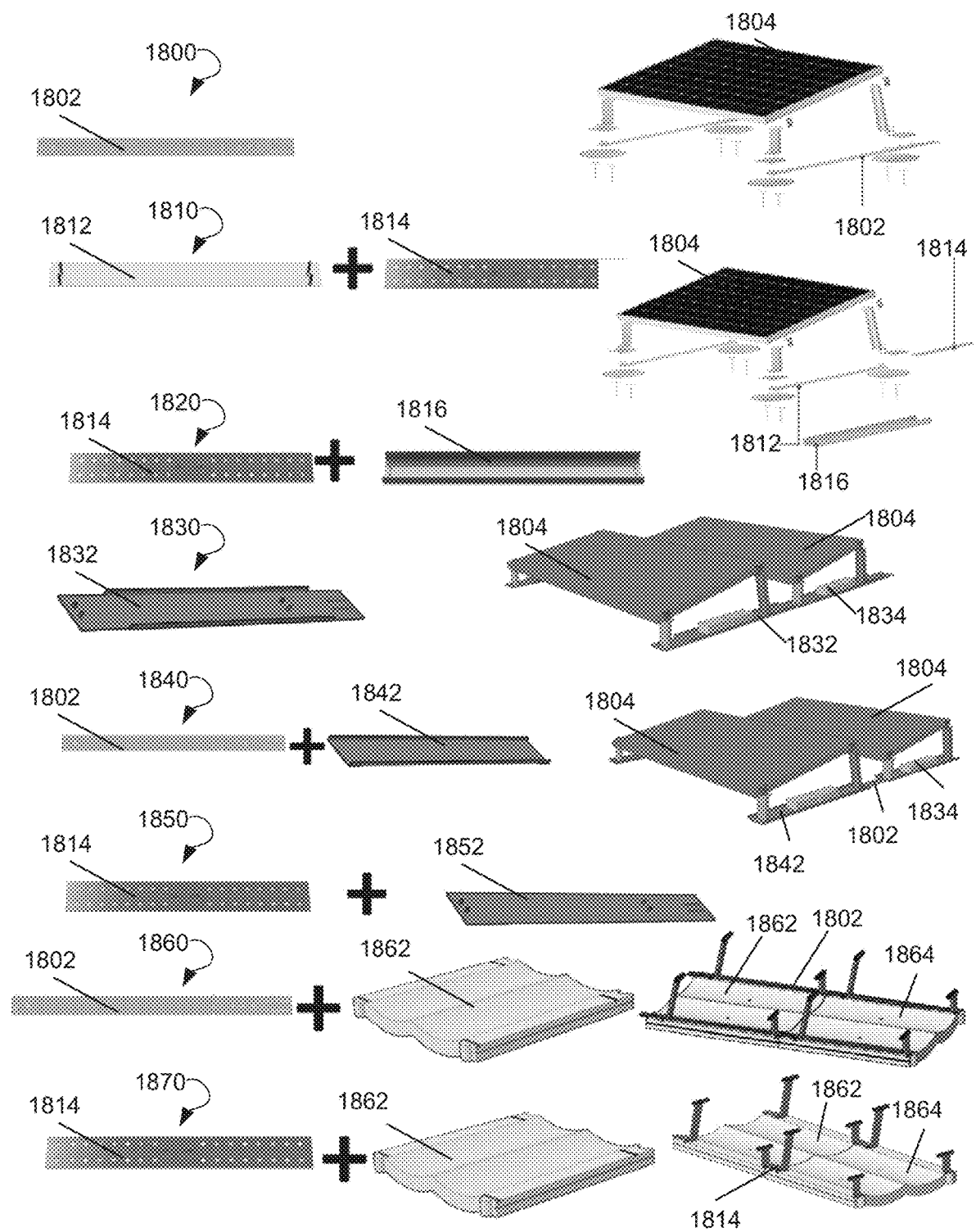
FIG. 18 shows combinations of straps used in strap assemblies, according to an example embodiment.

FIG. 18 shows combinations of straps used in strap assemblies, according to an example embodiment. A combination 1800 of straps shows a one-piece strap 1802 used for mounting a solar panel 1804. The one-piece strap 1802 is also shown on FIG. 15 as the strap 1506.

A combination 1810 of straps shows a strap 1812 and a universal connect strap 1814, and a combination 1820 of straps shows the universal connect strap 1814 and a ballast tray 1816. The ballast tray 1816 is also shown on FIG. 12 as the ballast tray 1208. The combinations 1810 and 1820 are used for mounting a solar panel 1804.

A combination 1830 of straps shows a hybrid strap 1832 used for mounting solar panels 1804. Specifically, the hybrid strap 1832 may be used for disposing a ballast 1834 on the hybrid strap 1832. The hybrid strap 1832 is also shown on FIG. 13 as the ballast tray 1306.

A combination 1840 of straps shows the strap 1812 and a ballast tray 1842 used for mounting solar panels 1804. Specifically, the ballast tray 1842 may be used for disposing a ballast 1834 on the ballast tray 1842.

A combination 1850 of straps shows the strap 1812 and a wide strap 1852 used for mounting solar panels 1804. The wide strap 1852 is also shown on FIG. 14 as the ballast tray 1406.

A combination 1860 of straps shows the strap 1812 and a plate 1862 being a module of the floating platform. The straps 1812 are used to connect the plate 1862 to another plate 1864.

A combination 1870 of straps shows the strap 1814 and a plate 1862 being a module of the floating platform. The straps 1814 are used to connect the plate 1862 to another plate 1864.

Figure 19:
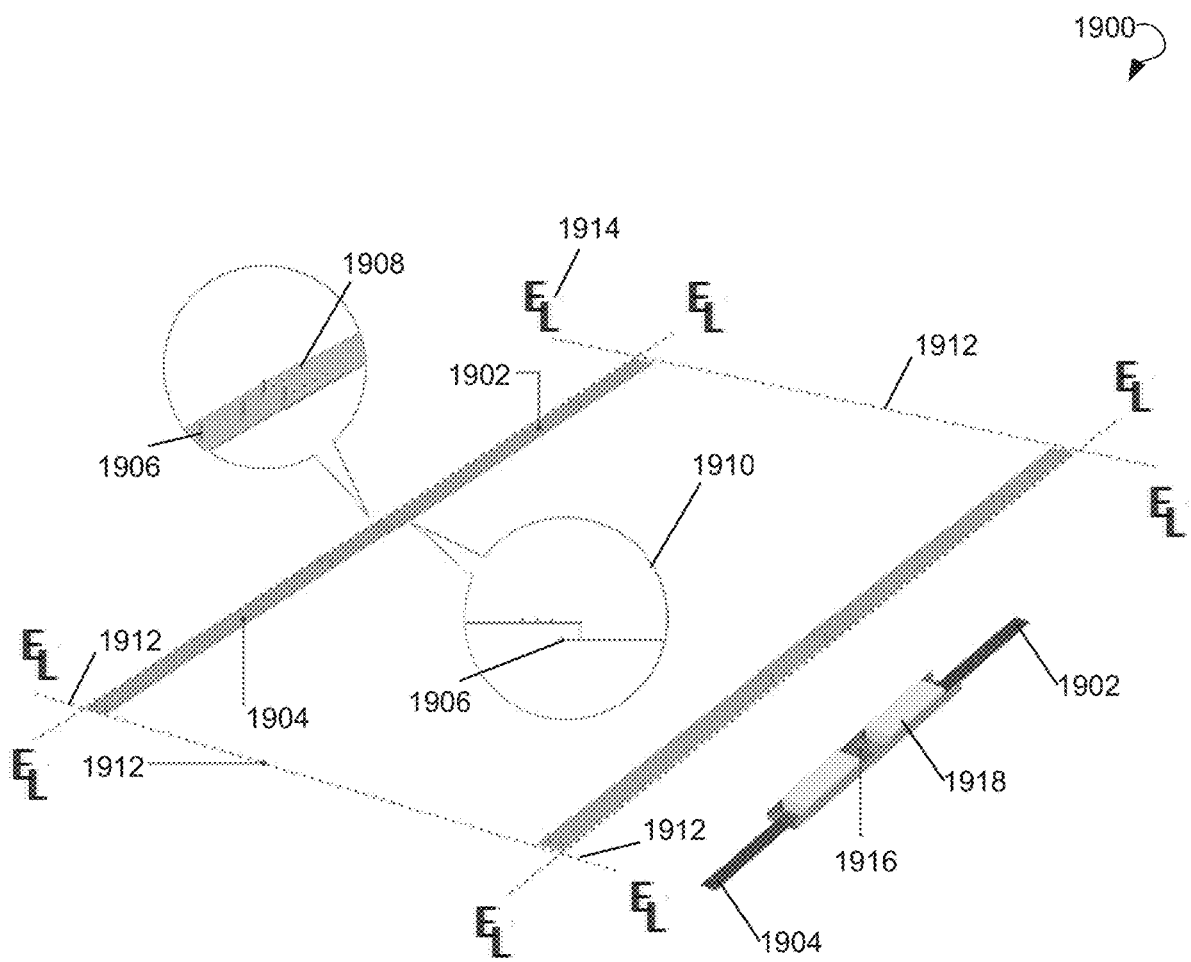
FIG. 19 is a schematic diagram representing a connection of two straps, according to an example embodiment.

FIG. 19 shows a schematic diagram 1900 representing connection of two straps. A first strap 1902 may be laid down and connected to a second strap 1904 using studs 1906 integrated in the second strap 1904 by inserting the studs 1906 into holes 1908 of the first strap 1904. The studs 1906 of the first strap 1902 are further shown on a side view 1910. A ballast tray 1916 and a ballast 1918 may be connected to the straps 1902 and 1904.

Edge lines 1912 may be marked on a surface to which the strap assembly is attached. Indicators 1914 showing the edge lines 1912 may be marked on the surface to guide installation of the strap assembly.

Figure 20:
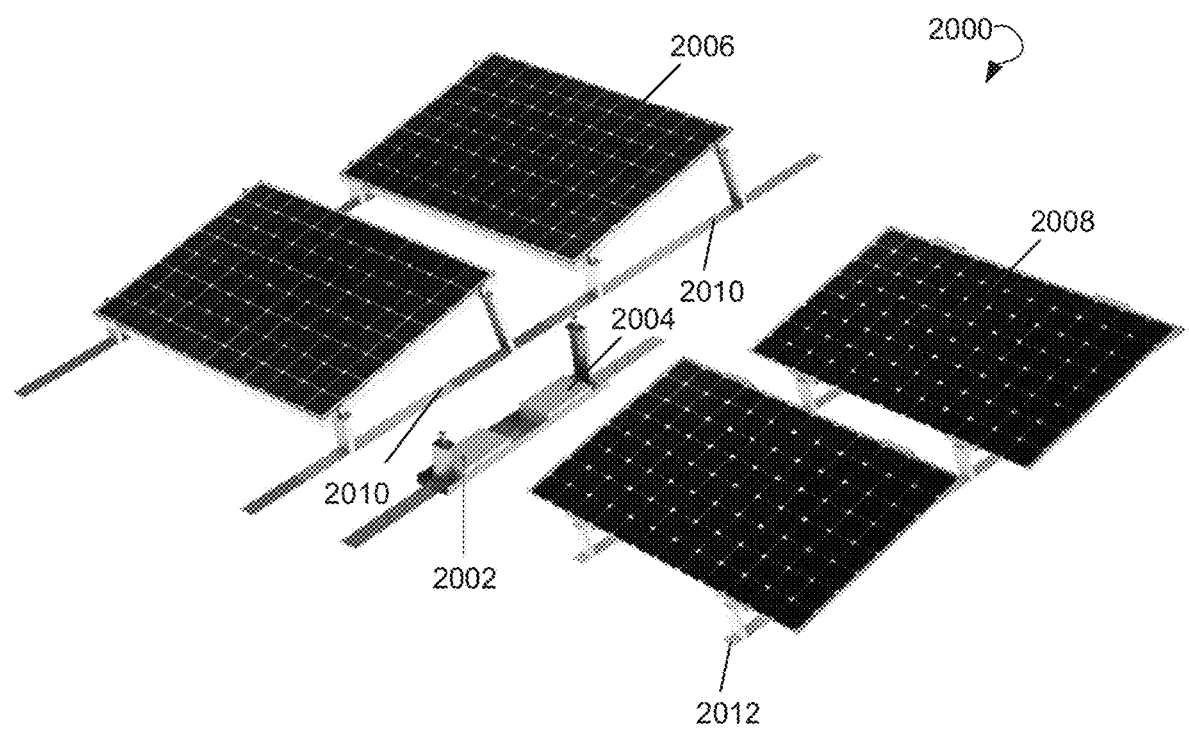
FIG. 20 is a schematic diagram showing a strap assembly and a ballast, according to an example embodiment.

FIG. 20 is a schematic diagram 2000 showing a strap assembly 2002 having a ballast 2004. The strap assembly 2002 may be used for mounting solar panels 2006 or frameless solar panels 2008 on a floating platform (not shown). Specifically, the strap assembly 2002 may be placed on straps 2010 of the solar panels 2006 and straps 2012 of the frameless solar panels 2008.

FIG. 21 is a schematic diagram 2100 showing a strap assembly 2102 having a ballast 2104. The strap assembly 2102 may be used for mounting solar panels 2106 on a floating platform (not shown). The solar panels 2106 may be double-sided solar panels that have photovoltaic cells on both an upper surface and a bottom surface. The solar panels 2106 may be suitable for east-west orientation when the solar panels 2106 are inclined in opposite directions. The east-west orientation of the solar panels 2106 may provide maximum density of light at any flat surfaces having an inclination of 5°, 10°, or 15°. As shown on a partial view 2108 of a general view 2110 of the strap assembly 2102, the strap assembly 2102 may have holes 2112 made to provide drain of water through the holes 2112.

The following reference numerals are used on FIGS. 1 through 21:

100 an upper perspective view
102 a top view
104 a side view
106 a cross-section view
108 a rear view
110 a floating platform
112 a plate
114 a ballast chamber
116 a float chamber
118 a bottom surface of a ballast chamber
120 a water surface
122 an upper surface a ballast chamber
124 a bottom surface of a float chamber
126 a channel
128 a first end of a channel
130 an upper surface of a float chamber
132 a second end of a channel
134 a first portion of a channel
136 a second portion of a channel
138 an opening in a first portion of a channel 140 a connection section
142 a strap assembly
144 a solar panel
146 a locking member
148 a spacer
150 a spacer locking member
152 a bumper
154 a side portion of a plate
156 a side portion of a plate
158 a receiver
160 a channel
162 a section
164 a strap
166 a support
168 a gap
200 an upper perspective view
202 a top view
204 a side view
206 a cross-section view
208 a rear view
210 a body
212 a top flange
214 a bottom flange
300 an upper perspective view
302 a top view
304 a side view
306 a plate
308 a plate
310 a partial view
312 a partial view
314 a gap
316 a partial view
318 a partial view
400 an upper perspective view
402 a top view
404 a side view
406 a cross-section view
408 a rear view
410 a section
412 a section
500 an upper perspective view
502 a top view
504 a side view
506 a cross-section view
508 a rear view
600 an upper perspective view
602 a top view
604 a side view
606 a cross-section view
608 a rear view
700 an upper perspective view
702 a top view
704 a side view
706 a plate
708 a plate
710 a partial view
712 a partial view
714 a gap
716 a partial view
718 a partial view
800 an upper perspective view
802 a top view
804 a side view
806 a cross-section view
808 a rear view
810 a plate
812 a spacer
900 an upper perspective view
902 a top view
904 a side view
906 a cross-section view
908 a rear view
1000 an upper perspective view
1002 a top view
1004 a side view
1006 a plate
1008 a plate
1010 a partial view
1012 a partial view
1014 a gap
1016 a partial view
1018 a partial view
1100 a general view
1102 a plate
1104 a plate
1106 a strap assembly
1108 a strap
1110 a first support
1112 a second support
1114 a connection section
1120 a general view
1122 a plate
1124 a plate
1126 a strap assembly
1128 a strap
1130 a first support
1132 a second support
1134 a connection section
1200 an upper perspective view
1202 a top view
1204 a side view
1206 a strap assembly
1208 a ballast tray
1210 a strep
1212 a support
1214 a support
1216 a body
1218 a top flange
1220 a bottom flange
1222 a ballast
1224 a fastener
1300 an upper perspective view
1302 a top view
1304 a side view
1306 a ballast tray
1308 a strap
1310 a strap assembly
1400 an upper perspective view
1402 a top view
1404 a side view
1406 a ballast tray
1408 a strap
1410 a strap assembly
1412 a fastener
1414 a fastener
1500 an upper perspective view
1502 a top view
1504 a side view
1506 a strap
1508 a strap
1510 a strap assembly
1512 a ballast tray
1600 a method
1602 operation of a method 1604 operation of a method
1606 operation of a method
1608 operation of a method
1610 operation of a method
1700 an exploded view
1702 a strap assembly
1704 a strap
1706 a first support
1708 a second support
1710 a single ply cap
1712 a fastener
1714 anchor plate
1716 a conductive end clamp
1718 a solar panel
1720 a frame
1730 an exploded view
1732 a strap assembly
1734 a strap
1736 a first support
1738 a second support
1740 a single ply cap
1742 a ballast tray
1744 a fastener
1746 an anchor plate
1760 an exploded view
1762 a strap assembly
1764 a strap
1766 a first support
1768 a second support
1770 a single ply cap
1772 a fastener
1774 an anchor plate
1776 a frameless clamp
1800 a combination of straps
1802 a one-piece strap
1804 a solar panel
1810 a combination of straps
1812 a strap
1814 a universal connect strap
1816 a ballast tray
1820 a combination of straps
1830 a combination of straps
1832 a hybrid strap
1834 a ballast
1840 a combination of straps
1842 a ballast tray
1850 a combination of straps
1852 a wide strap
1860 a combination of straps
1862 a plate
1864 a plate
1870 a combination of straps
1900 a schematic diagram
1902 a first solar strap
1904 a second strap
1906 a stud
1908 a hole
1910 a side view
1912 an edge line
1914 an indicator
1916 a ballast tray
1918 a ballast
2000 a schematic diagram
2002 a strap assembly
2004 a ballast
2006 a solar panel
2008 a frameless solar panel
2010 a strap
2012 a strap
2100 a schematic diagram
2102 a strap assembly
2104 a ballast
2106 a solar panel
2108 a partial view
2110 a general view
2112 a hole Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A floating platform for solar panels, the floating platform comprising:
a plurality of plates, each of the plurality of plates comprising:
a ballast chamber filled with a ballast material, the ballast chamber having a bottom surface; and
a float chamber disposed over the ballast chamber;
a channel, the channel being a conduit and, having a first portion, the first portion being fluidly connected to and providing an opening in a bottom surface of the ballast chamber, passing through the ballast chamber, and having one or more openings adapted to pass water into the ballast chamber, and having a second portion, the second portion being fluidly connected to the first portion and passing through the float chamber, the second portion being fluidly connected to and providing an opening in an upper surface of the float chamber, permitting air entering from the one or more openings in the first portion in the ballast chamber to exit through the opening in the upper surface of the float chamber;
one or more connection sections for placing one or more strap assemblies to be attached to the plurality of plates, the one or more strap assemblies being provided for disposing one or more solar panels on the plurality of plates; and
a locking member on one or more side portions of the plurality of plates.

2. The floating platform of claim 1, wherein the float chamber has an upper surface, the upper surface being configured to reflect light on a bottom surface of the one or more solar panels, wherein the one or more solar panels comprise photovoltaic cells on the bottom surface and on an upper surface of the one or more solar panels.

3. The floating platform of claim 1, wherein each of the plurality of plates further comprises a bumper on a side portion of each of the plurality of plates and a receiver on an opposite side portion of each of the plurality of plates, wherein the receiver is configured to receive the bumper.

4. The floating platform of claim 1, wherein the ballast material includes one of the following: water, gravel, and concrete, a combination of water and gravel, and a combination of water and concrete.

5. The floating platform of claim 1, wherein the float chamber is filled with one of the following: air and a polymer foam.

6. The floating platform of claim 1, wherein the float chamber is sealed.

7. The floating platform of claim 1, wherein the one or more connection sections are disposed on at least two peripheral portions of each of the plurality of plates, wherein the one or more connection sections are flat.

8. The floating platform of claim 7, wherein the one or more connection sections have molded channels for attaching the one or more strap assemblies to the one or more connection sections.

9. The floating platform of claim 1, wherein each of the plurality of plates has a linearly extended parabolic shape on a top surface of the each of the plurality of plates to reflect an even distribution of light on a bottom surface of the one or more solar panels.

10. The floating platform of claim 1, wherein each of the plurality of plates has a plurality of sections disposed adjacently, each of the plurality of sections having a linearly extended parabolic shape to reflect an even distribution of light on a bottom surface of the one or more solar panels.

11. The floating platform of claim 1, wherein each of the plurality of plates is flat.

12. The floating platform of claim 1, further comprising a plurality of spacers, each of the plurality of spacers being disposed between two adjacent plates of the plurality of plates.

13. The floating platform of claim 12, wherein each of the plurality of spacers comprises a spacer locking member to connect a spacer of the plurality of spacers to the locking member of each of the plurality of plates.

14. The floating platform of claim 1, wherein the plurality of plates are made of a plastic material.

15. The floating platform of claim 1, further comprising the one or more strap assemblies placed on the one or more connection sections, the one or more strap assemblies comprising:
a plurality of straps connected to the one or more connection sections of the plurality of plates; and
at least one support disposed on each of the plurality of straps, the at least one support having a body having a top end and a bottom end, a top flange attached to the top end of the body and a bottom flange attached to the bottom end of the body,
wherein the bottom flange is attached to at least one of the plurality of straps; and
wherein the top flange is configured to be attached to one of the one or more solar panels.

16. The floating platform of claim 15, further comprising at least one ballast placed on one or more of the plurality of straps.

17. The floating platform of claim 16, wherein the one or more of the plurality of straps has vertical side walls, wherein the at least one ballast is placed between the vertical side walls of the one or more of the plurality of straps.

18. The floating platform of claim 17, wherein the vertical side walls are located along a whole length of the one or more of the plurality of straps or along a portion of a length of the one or more of the plurality of straps.

19. A floating platform for solar panels, the floating platform comprising:
a plurality of plates, each of the plurality of plates comprising:
a ballast chamber filled with a ballast material, the ballast chamber having a bottom surface; and
a float chamber disposed over the ballast chamber, wherein the float chamber has an upper surface, the upper surface being configured to reflect light on a bottom surface of one or more solar panels, wherein the one or more solar panels comprise photovoltaic cells on the bottom surface and on an upper surface of the one or more solar panels;
a channel, the channel being a conduit and, having a first portion, the first portion being fluidly connected to and providing an opening in a bottom surface of the ballast chamber, passing through the ballast chamber, and having one or more openings adapted to pass water into the ballast chamber, and having a second portion, the second portion being fluidly connected to the first portion and passing through the float chamber, the second portion being fluidly connected to and providing an opening in an upper surface of the float chamber, permitting air entering from the one or more openings in the first portion in the ballast chamber to exit through the opening in the upper surface of the float chamber;
one or more connection sections for placing one or more strap assemblies to be attached to the plurality of plates, the one or more strap assemblies being provided for disposing the one or more solar panels on the plurality of plates;
a locking member on one or more side portions of the plurality of plates; and
the one or more strap assemblies placed on the one or more connection sections, the one or more strap assemblies comprising:
a plurality of straps connected to the one or more connection sections of the plurality of plates; and
at least one support disposed on each of the plurality of straps, the least one support having a body having a top end and a bottom end, a top flange attached to the top end of the body and a bottom flange attached to the bottom end of the body,
wherein the bottom flange is attached to at least one of the plurality of straps; and
wherein the top flange is configured to be attached to one of the one or more solar panels.

* * * * *